United States Patent [19]

Baker et al.

[11] Patent Number: 5,226,118
[45] Date of Patent: Jul. 6, 1993

[54] DATA ANALYSIS SYSTEM AND METHOD FOR INDUSTRIAL PROCESS CONTROL SYSTEMS

[75] Inventors: Michael K. Baker, Los Gatos; Leslie A. Lane; David S. Perloff, both of Sunnyvale; Alexander Freedland, Campbell, all of Calif.

[73] Assignee: Prometrix Corporation, Santa Clara, Calif.

[21] Appl. No.: 647,742

[22] Filed: Jan. 29, 1991

[51] Int. Cl.⁵ .............................................. G06F 15/62
[52] U.S. Cl. .................................... 395/161; 395/155; 340/750
[58] Field of Search ............... 395/140, 155, 157, 161; 340/747, 750; 364/200 MS File, 900 MS File

[56] References Cited

U.S. PATENT DOCUMENTS

| | | | |
|---|---|---|---|
| 4,805,089 | 2/1989 | Lane et al. | 364/188 |
| 4,860,204 | 8/1989 | Gendron et al. | 364/300 |
| 4,951,190 | 8/1990 | Lane et al. | 364/188 |

Primary Examiner—Phu K. Nguyen
Attorney, Agent, or Firm—Flehr, Hohbach, Test, Albritton & Herbert

[57] ABSTRACT

A data analysis computer system stores measurement data obtained from a multiplicity of distinct predefined processes. The system can store definitions for many data analysis charts, each of which depicts stored measurement data for a specified process. Further, chart groups can be defined. Each chart group comprises a set of data analysis charts that grouped together for convenient access. Charts are displayed by either (1) selecting a defined chart, or (2) by selecting a chart group and then selecting one or more charts from the selected group for, and then simultaneously displaying the selected data analysis charts. A data display gallery feature divides the computer system's display into a two dimensional array of cells, and assigns cell definitions to at least a subset of the cells. Each cell definition consists of either a set of measurement data which can be displayed as a unit, or a mathematical combination of a plurality of specified sets of measurement data. Typically each displayed cell contains a data map depicting a set of data in accordance with a corresponding cell definition. Each displayed data analysis chart is displayed with an expand bar having two ends and a expansion selection element positioned therebetween. The expansion element can be moved to various positions along the expansion bar, and the system responds by scaling each data analysis chart in accordance with the position of the expansion selection element. This allows the user to quickly re-scale each data analysis chart to the user's liking.

28 Claims, 22 Drawing Sheets

DATA ANALYSIS SYSTEM AND METHOD FOR INDUSTRIAL PROCESS CONTROL SYSTEMS

The present invention relates generally to user interfaces for data analysis computer systems, and particularly to methods and systems for producing trend charts and other visual displays of data which facilitate analysis of large sets of measurement data.

BACKGROUND OF THE INVENTION

While many computer controlled machines are designed to automatically record data relevant to the performance of the machine, the analysis of this data is generally not automatic. This is especially true for machines which are used to perform a variety of different processes in an industrial environment. As a result, discovery of process control problems tends to be delayed until there is a noticeable degradation in the quality of the product being made or in the process being performed.

The present invention provides a system and method of database management that facilitates the performance of data management and analysis tasks. At the push of just a few buttons, the present invention automatically sorts through the measurement data stored in the system and performs a specified data management task, such as displaying a trend chart for previously recorded data for a specified process, of for displaying on a single computer screen, side by side, the resistivity maps of a dozen wafers so as to allow visual comparison of those maps.

Additional background concerning user interfaces for facilitating the analysis of measurement data can be obtained from the assignee's previously obtained patents, including U.S. Pat. Nos. 4,679,137, 4,805,89, 4,843,538, 4,873,623, and 4,951,190, hereby incorporated by reference.

The invention described in this specification may be applied generally in computer controlled machines which perform various production or testing processes. It may also be applied to data collection and data base management programs. However, the detailed description of the invention will be given in terms of analyzing measurement data from automated resistivity testers, which perform sheet resistance mapping of semiconductor wafers, and automated film thickness testers, which map the thickness of films deposited on semiconductor wafers. Such equipment is used to characterize the performance of semiconductor wafer manufacturing equipment utilized to form surface layers as part of the process of manufacturing semiconductor devices such as, for example, large scale integrated circuits.

The preferred version of an automated resistivity tester which generates appropriate measurement data to be analyzed using this invention is disclosed in U.S. Pat. No. 4,723,207, entitled "APPARATUS AND METHODS FOR SEMICONDUCTOR WAFER TESTING," incorporated herein by reference for background information.

The correctness and uniformity of implant dosage across a semiconductor wafer can be determined in an automatic sheet resistance mapping system which has the capability of taking multiple test readings in both a contour map and diameter scan mode. From these tests and printouts, the engineer in charge of a process can determine whether the ion implantation equipment is operating properly.

To encourage the use of testing equipment such as automated resistivity testers, it is important to provide an overall computer control program for the tester which is easy for the engineer to set up to perform in-process monitoring measurements which will provide meaningful data.

Prior Art User Interfaces

In the assignee's previous patents, access to measurement data for detailed data management tasks is provided graphically through the use of trend charts, statistical quality control (SQC) charts and two and three dimension measurement "maps". SQC charts are a type of trend chart which shows separate $\overline{X}$ (median value) and R (range) charts. Trend charts and statistical quality control charts depict trends in the measurement data for selected processes. Each data point in such charts represents the means and standard deviation of a specified set of measurements performed at many points on the surface of a semiconductor wafer. The assignee's prior art user interface allows users to point at any data point in the chart and to thereby gain access the corresponding record of data for detailed data analysis or for use in a data management task.

U.S. Pat. No. 4,873,623 provides a sophisticated user interface for defining individual trend charts, enabling an engineer to predefine what parameter or combination of measurement parameters will be displayed in a trend chart each time that specified trend chart is called up.

The present invention comprises improvements and new features added to the user interfaces described in the assignee's previous patents. In particular, it has been found that while trend charts are very useful, there are many situations in which it would be useful to be able to visually compare two or more trend charts, for example, to see if there is any correlation between the trends in two distinct measurements. Using the prior art user interfaces, one could not rearrange the computer display to display such trend charts side by side, and therefore it was necessary to print the trend charts in order to make such comparisons. This is inconvenient if what one wants to do is compare one trend chart against a large number of other trend charts in the hope of finding a pattern which is indicative of a manufacturing process problem. To implement this capability, the present invention provides a mechanism for predefining groups of measurement data sets, called chart groups, to make it easy to generate data analysis charts for sets of data that logically belong together.

Another facility provided by the assignee's prior user interfaces was the ability to display a two or three dimensional map of the measurements for a specified wafer. While such displays are useful, the applicants have found that it would be very useful to be able to visually compare many such maps on a single screen, and furthermore, to be able to generate mathematical combinations of the measurements from two or more wafers so as to identify similarities and differences between various sets of measurements.

Another feature that the applicants have found important to analyzing trend charts is giving the user the ability to compress and expand the horizontal (time) scale of such charts, since some trends operate on much longer or shorter time scales than other trends. While other data display programs allow the user to re-scale axes, the present invention provides a significantly improved user interface for performing this function.

Finally, in industrial environments, the amount of data collected by a wide variety of systems can be daunting, making it difficult to locate specific sets of measurement data, and also difficult to perform specified analyses on such data. The present invention provides a special "navigator" feature which helps the user quickly sort through large databases of measurement data so as to locate a specific measurement and/or data analysis task.

SUMMARY OF THE INVENTION

In summary, the present invention is a data analysis computer system which stores measurement data obtained from a multiplicity of distinct predefined processes. The system can store definitions for many data analysis charts, each of which depicts stored measurement data for a specified process. Further, chart groups can be defined. Each chart group comprises a list of data sets that are grouped together for convenient access. Charts are displayed by either (1) selecting a data set from the system's data hierarchy and then selecting a chart for analyzing that set of measurement data, or (2) by selecting a chart group, then selecting one or more data sets in the selected chart group, and then simultaneously displaying charts analyzing the selected data sets.

An important feature of the present invention, herein called the Gallery, is a graphic spreadsheet having a two dimensional array of cells, with cell definitions assigned to at least a subset of the cells. Each cell definition consists of either a set of measurement data which can be displayed as a unit, or a mathematical combination of a plurality of specified sets of measurement data. Typically each displayed cell contains a data map depicting a set of data in accordance with a corresponding cell definition, although cells may contain trend charts and may be also used to display text associated with a set measurements.

Each displayed data analysis chart is displayed with an expand bar having two ends and a expansion selection element positioned therebetween. The expansion element can be moved to various positions along the expansion bar, and the system responds by scaling each data analysis chart in accordance with the position of the expansion selection element. This allows the user to quickly re-scale each data analysis chart to the user's liking.

BRIEF DESCRIPTION OF THE DRAWINGS

Additional objects and features of the invention will be more readily apparent from the following detailed description and appended claims when taken in conjunction with the drawings, in which:

FIG. 18 depicts a data analysis task selection menu.

FIG. 19 depicts a menu for selecting a chart group.

DESCRIPTION OF THE PREFERRED EMBODIMENT

Figure 1:
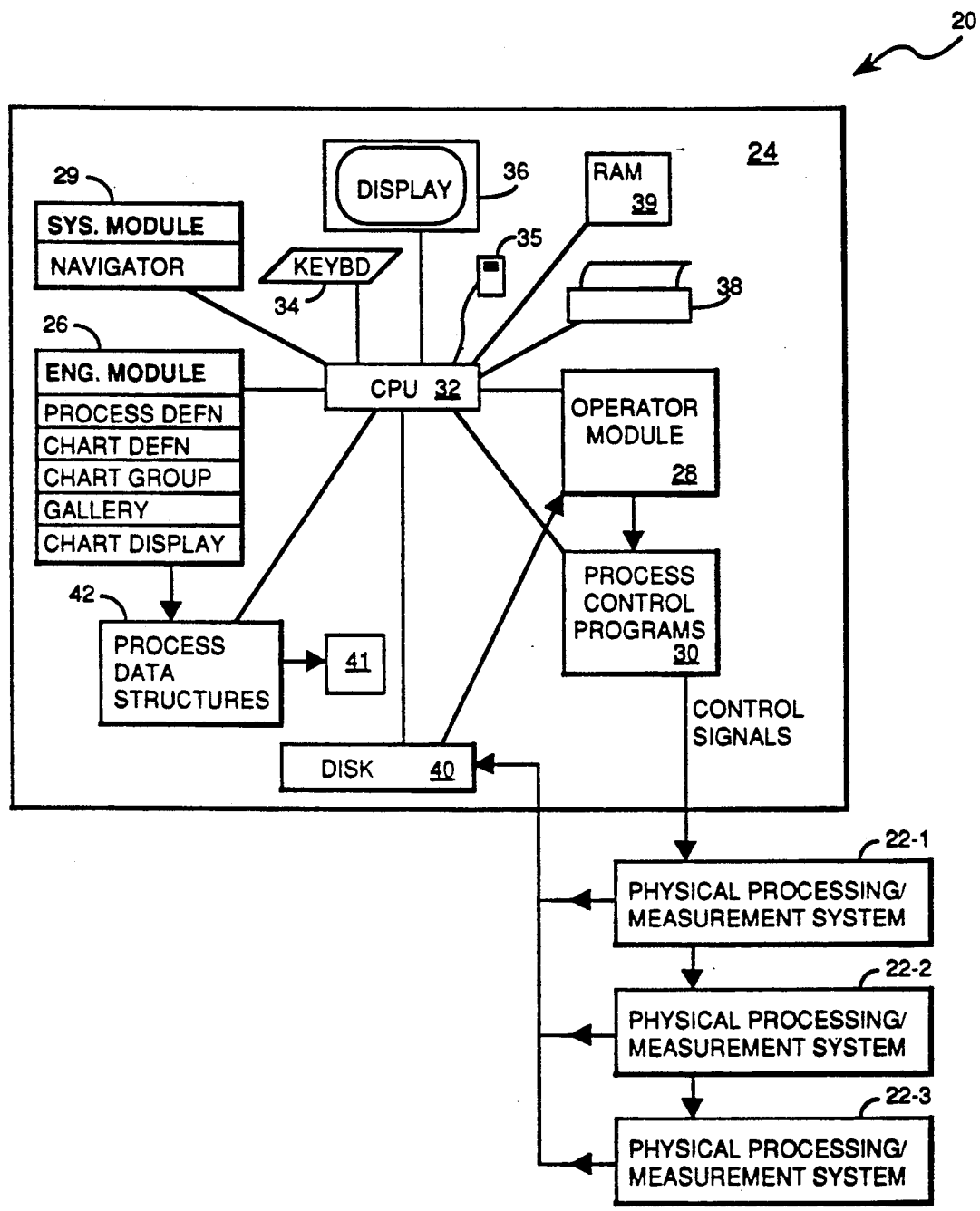
FIG. 1 is a block diagram of a process control system in accordance with the present invention.

Referring to FIG. 1, there is shown a block diagram of a system 20 incorporating the apparatus of this invention and capable of carrying out the method of this invention. A plurality of physical processing systems 22-1, 22-2, and 22-3, such as a semiconductor wafer resistivity tester 22-1, a film thickness measurement system 22-2, and a multiparameter lithography tester 22-3, are controlled by a computer based control system 24. The control system 24, in accordance with this invention, includes an engineering set up module 26 and an operator module 28. The control system 24 further includes a set of process control programs 30, each of which is used to control one of the physical systems 22 while it is performing a specified type of process.

The control system 24 includes a computer central process unit (CPU) 32, such as an 80386 microprocessor made by Intel TM, a keyboard 34 and/or mouse 35 or equivalent device for entering commands and data into the system 24, a display device 36 such as a color monitor, a printer 38 and high-speed random access memory (RAM) 39. A large hard disk 40, such as a 100 megabyte internal hard disk or a removable 40 megabyte cartridge, is used to store data structures 42 which define the process parameters used in the processes performed by the physical system 22; it is also used to store the measurement data generated by the physical system 22 during operation as well as measurement derived data generated by the CPU 32 such as mean values and standard deviations.

As explained in greater detail in U.S. Pat. No. 4,679,137, the engineering module 26 is a set up control program (called the engineering set up control program) which is used by engineers to define the degree and types of restraints which limit and control the types of processes which can be run using the physical system 22. These tasks of the engineering module 26 are sometimes herein called process definition. Other tasks performed by the engineering module 26 include defining data analysis charts (such as trend charts, wafer maps, etc.), defining chart groups, displaying various data analysis charts, and facilitating visual data comparison through the display of a "graphic spread sheet", herein called a Gallery of wafer maps. These tasks are described in more detail below. In the preferred embodiment, the computer used is an IBM PC/AT compatible computer using a 25 megahertz 80386 microprocessor.

The engineering module furthermore stores a representation of the set of decisions made by the person using the engineering set up program on a portable magnetic disc 41. These choices are represented by entries in a set of data structures 42 which are used by both the engineering set up and process control programs.

The operator module 28 is an operator process control program used to select and run processes, which have been previously set up using the engineering set up module 26, on one of the physical systems 22. In addition, there is a system software module 29, including a system navigate feature described below. The system navigate feature allows a user to move directly from one task to another without having to go through a large number of task selection menus, which is particularly useful in a system having a deep data hierarchy.

As described in U.S. Pat. No. 4,873,623, the operator process control program 28 includes a process selection program for selecting which of the available processes is to be run on the physical system 22, a parameter entry program for specifying parametric values for use in conjunction with the process to be run by a physical system 22, and a data analysis or data management program for analyzing the measurement data collected by the control system 24 from the physical system 22.

In the preferred embodiment, the same computer can be used for engineering set up, process control, and data management. On the other hand, an engineer can use one computer to set up the processes he wants the operator to run, store his process definitions on a portable disk 41, and can then hand the disk 41 to an operator for use on a separate computer control system 24. Operators are denied access to the engineering module 26 by requiring knowledge of a password to use the engineering module 26.

In the preferred embodiment the physical system 22-1 is a wafer resistivity tester with three corresponding process control programs 30. One process control program, called Contour Map, causes the CPU 32 to send control signals to the tester 22-1 which directs it to measure and record the resistivity of a semiconductor wafer at a specified number of separate position coordinates on the wafer. Another process control program, called Diameter Scan, generates control commands which direct the tester 22-1 to measure and record the resistivity of a semiconductor wafer at a specified number of separate test sites along a diameter line. A third, called Quick Check, measures the resistivity at a small number of test sites to quickly determine the approximate resistivity of a semiconductor wafer.

Figure 2:
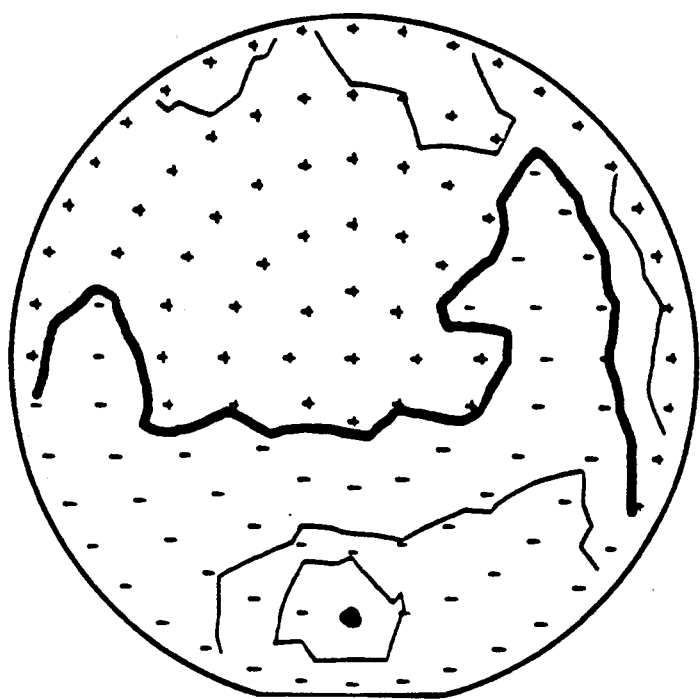
FIG. 2 is a contour map and FIG. 3 is a three dimensional wafer resistivity map generated by a resistivity mapping program in the preferred embodiment.
Figure 3:
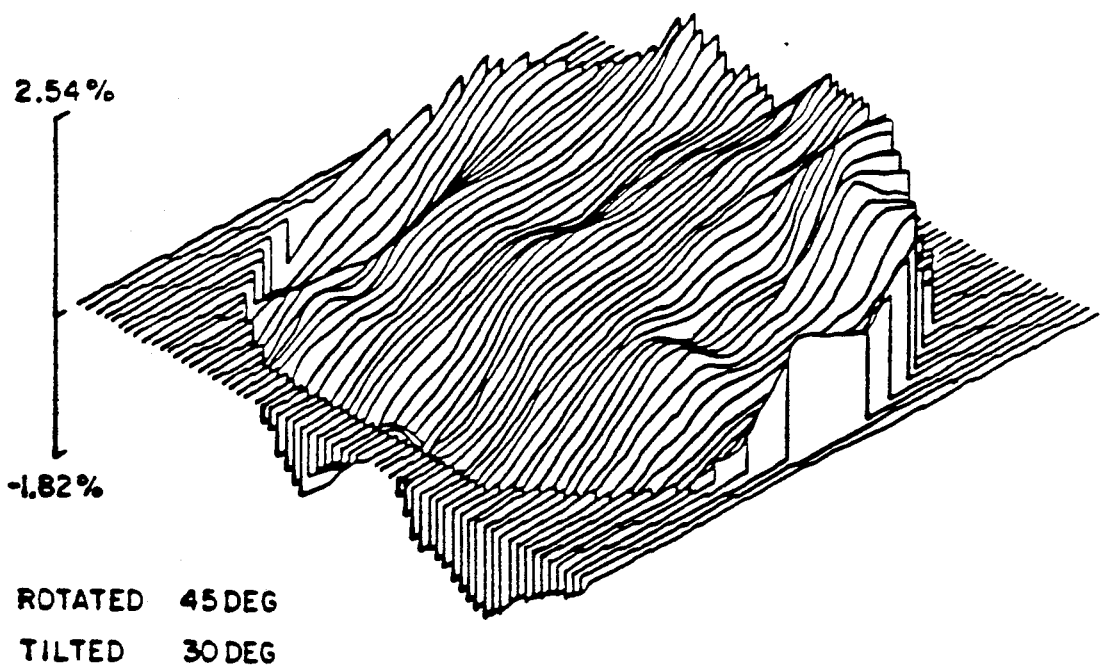

When a contour map process is used, the computer system will collect measurement data that can be displayed in the form of a contour map, such as the one shown in FIG. 2. FIG. 3 is a three dimensional wafer resistivity map generated by data collected using the contour map resistivity measurement process of the preferred embodiment. The measurement data obtained from the test system is stored on disk 40.

TREND CHARTS

Figure 4:
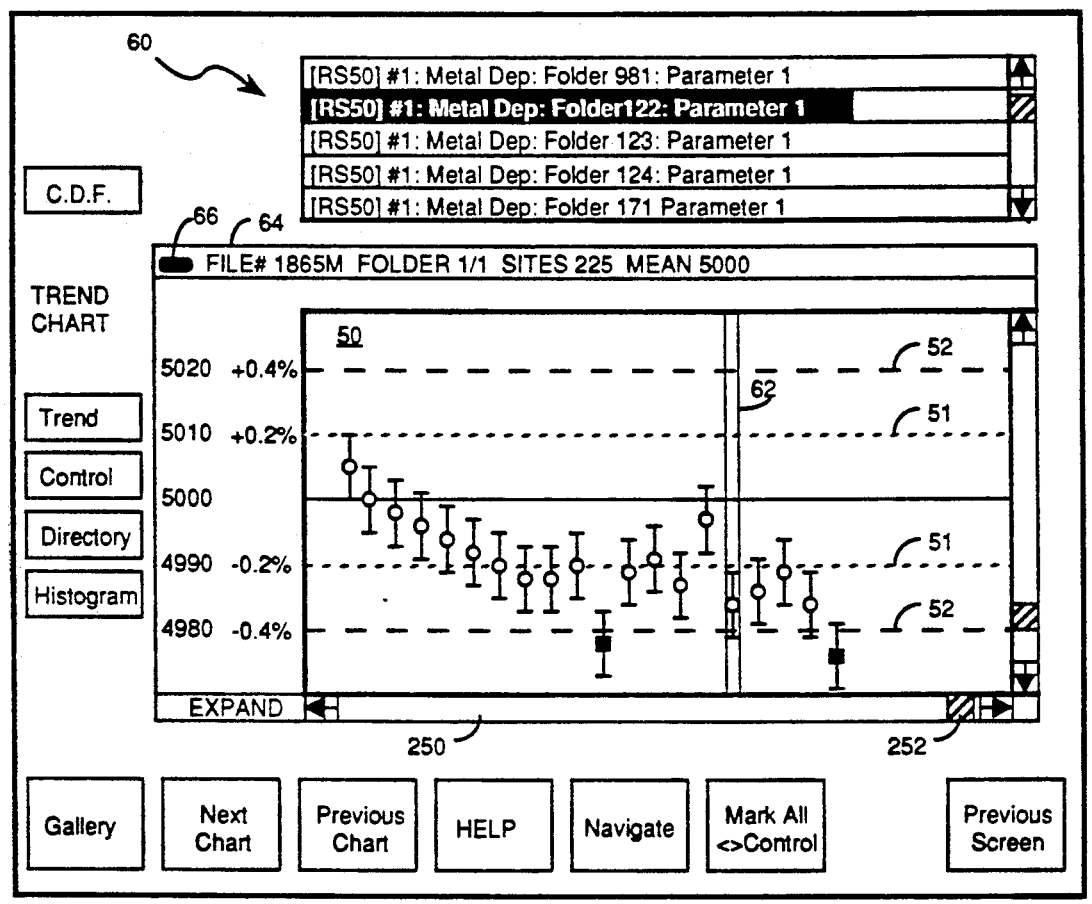
FIGS. 4, 5 and 6 depict trend charts generated by the preferred embodiment of the present invention.

Referring to FIG. 4, trend charts show trends in the measurement data for a preselected number of previous uses of a selected process. For a wafer film resistivity measurement system, a typical trend chart would be a chronologically ordered plot of the mean measured resistivity values and a three standard deviation range of the measurements about the mean value. However, the user can define any number of different Trend Charts using methodology disclosed in U.S. Pat. No. 4,873,623.

Viewing a trend chart 50 on the system's display, one can easily determine if the measured values (e.g., film thickness or resistivities) are close to a specified target value or are moving away from the target. This makes it easy to see trends which might be hard to detect from inspection of the raw measurement data.

To help the user interpret the Trend Chart, it is divided into zones: an inner zone which represents an acceptable range of data values; a middle zone above and below the inner zone, which represents a "warning" range of data values; and an outer zone above and below the middle zone, which represents unacceptable data values. Yellow warning lines 51 mark the beginning of the warning range, and red lines 52 mark the beginning of the out of "spec" range.

A "C.D.F." (Cabinet, Drawer, Folder) chart selection menu 60 at the top of the display shown in FIG. 4 is used to select the Trend Chart to be displayed, as will be described in more detail below with regard to "Chart Groups". A vertical highlight bar 62 is used to select individual measurement sets from the displayed trend chart. It highlights one data point in the Trend Chart, providing a convenient visual tool for accessing data records in a database (and thus acts as a substitute for the traditional "query" instructions used by most database programs). Note that in the preferred embodiment, each data point corresponds to a set of measurements on one wafer.

If the user thinks a data point on the currently displayed Trend Chart warrants further attention, he can move the highlight bar 62 (e.g., using a mouse 35) until it points at the offending datum. The identity of the datum being pointed at by pointer 62 is displayed on prompt line 64.

Figure 5:
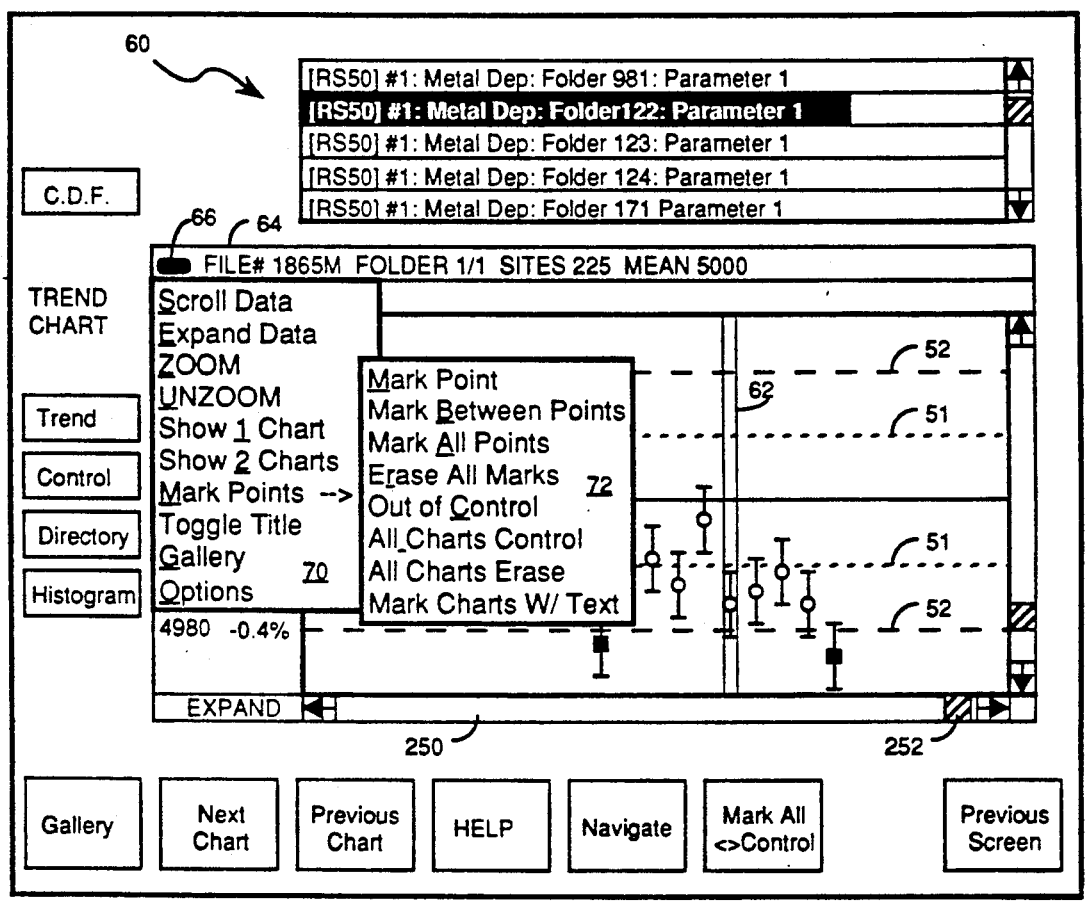
Figure 20:
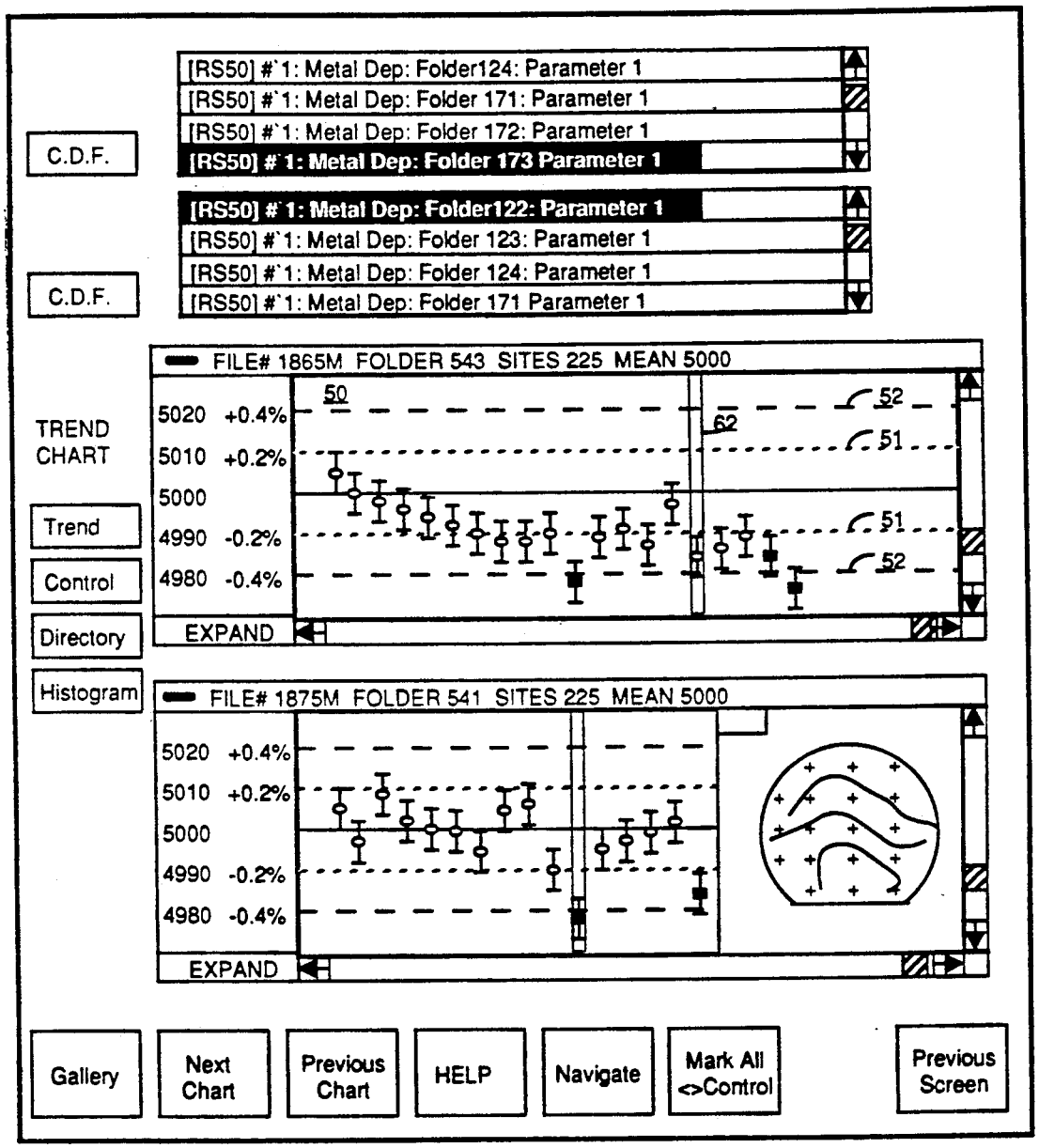
FIG. 20 depicts a screen simultaneously displaying two trend charts selected from a chart group.

A number of data analysis options are accessed by clicking on icon 66 at the top of the trend chart, which pulls down the menu 70 shown in FIG. 5. The "Scroll Data" option in the pull-down menu 70 scrolls the display data points so that data points not currently shown in the chart can be seen. The "Expand Data" option in menu 70 expands the chart around the currently selected data point by a fixed increment, such as five percent, and thus is equivalent to use of the Expand Bar, as will be explained below in more detail. The "Show 1 Chart" and "Show 2 Charts" options allow the user to either simultaneously display two trend charts, as shown in FIG. 20, or to display just one trend chart. "Mark Points" is used to select data points for further analysis. A number of methods of marking data points are made available by sub-menu 72. Selection of the "Mark All < > Control" box at the bottom of the trend chart automatically selects all data points above or below lines 52, which denote the maximum and minimum acceptable values for the measured parameter being shown.

After marking a number of data points in one or two trend charts, selection of the Gallery command will generate a gallery of wafer map images for all the selected data points. The Gallery command is discussed in more detail below.

Figure 6:
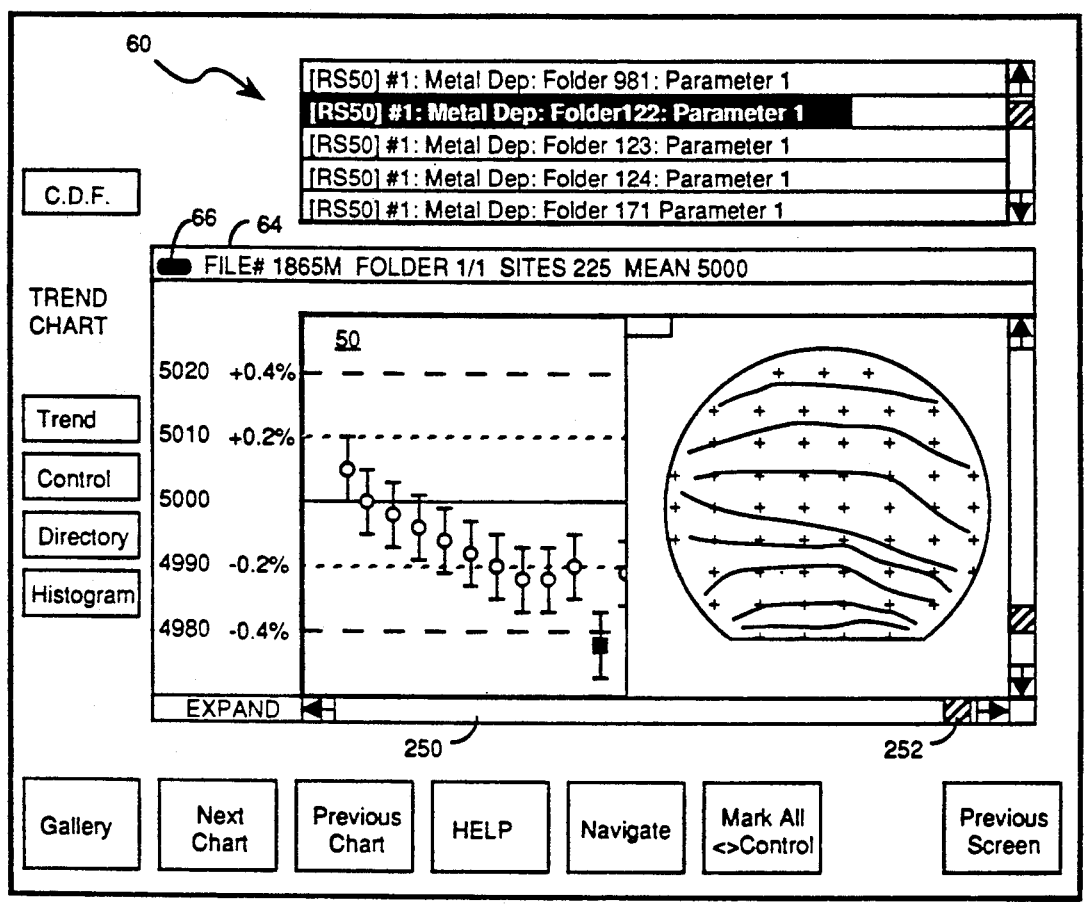

If the user "double clicks" on a data point, using the system's mouse 35, the system will superimpose on top of the trend chart a wafer map for the selected item, as shown in FIG. 6. If a contour map process was used to collect data for the selected data point (i.e., the selected wafer), then a plot similar to the plots in either FIGS. 2 or 3 will be generated.

The trend charts shown in FIGS. 4, 5 and 6 act both as a powerful data analysis tool, by themselves, and also as tool for selecting data points for further data analysis. As such, the trend charts of the present invention provide a powerful and convenient method of accessing specific sets of data of interest from large masses of stored measurement data. The user need not have any knowledge as to how this data is stored, nor even the names of the "files" or other data structures in which the data is stored. The user need only be able to identify and select data points of interest from the available trend charts, and then select the data analysis to be performed on those selected data points.

SYSTEM HIERARCHY

Figure 7:
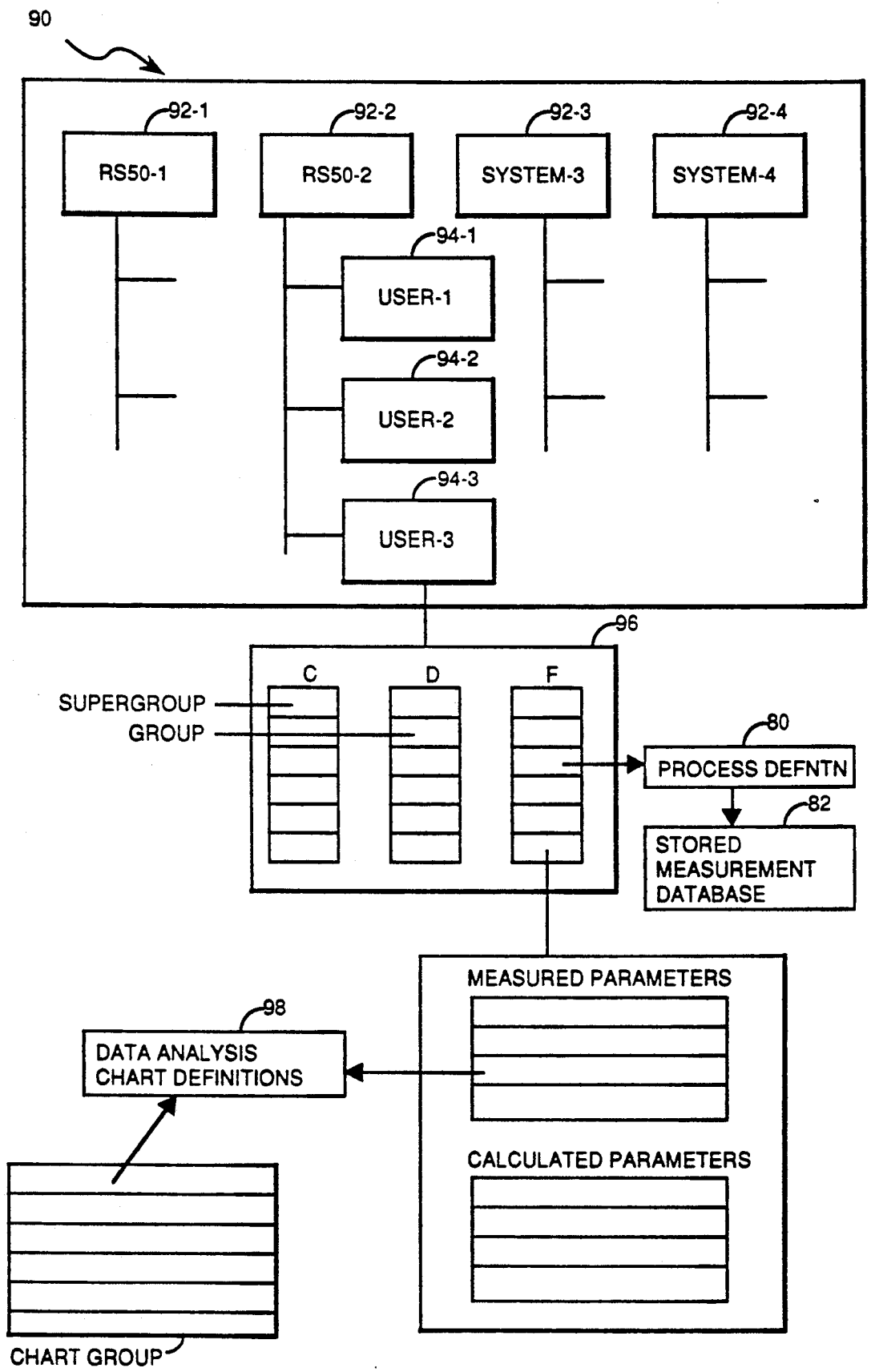
FIG. 7 is a conceptual diagram depicting the data collection and analysis tasks performed by the present invention.

Referring to FIG. 7, the present invention allows an engineer to set up and store process definitions for a large number of processes. For example, the engineer could define several dozen test procedures to be used at different points of a semiconductor processing sequence, with different versions of the test procedures for different product lines and even for different operator personnel. Each such test procedure is herein called a "process" for which there is a process definition record 80, which specifies parameters that control the running of the process. The measurement data for each such process is stored in a database 82 and is tagged or otherwise stored so that all the records of measurement data for that process can be retrieved quickly for such purposes as generating a trend chart for the process.

The data analysis system of the present invention can be used to store and track measurements for a number of different measurement systems, and can run a rather large number of distinct test/measurement processes for each such system. The present invention provides a system and method of keeping track of all these processes and data that is both easy to understand and easy to use. In particular, both process definitions and measurement data are stored using the hierarchical organization 90 shown in FIG. 7. The top layer of the hierarchy comprises the different measurement/test systems 92-1 to 92-4 that are to be used with the data analysis system. Depending on the particular circumstances in which the data analysis system is being used, there could be anywhere from one to several dozen such measurement systems 92. For each such measurement system 92 the data analysis system can set up a distinct "account" for various users 94-1 to 94-3. This allows each user to make his/her own process definitions and to segregate the measurement data obtained using those process definitions. The data analysis system stores the names of the systems and system-users as a "two-level" dynamic menu (described in more detail below) which allows easy selection of the branch of the hierarchy 90 that one wants to access.

From this point on, we will consider the process definitions and stored measurement data for one particular system user (i.e., account) 94. In the preferred embodiment, the processes defined for one such user are arranged in a three-level hierarchy which is analogous to a set of file cabinets (C), each of which has a set of drawers (D), with each drawer holding a number of files (F). Thus, in order to access either a process definition, or the measurement data for a particular process, one selects a cabinet, then a drawer within that cabinet and then a file within the selected drawer. This is set up as a three level dynamic menu, represented by display 96 in FIG. 7—the operation of which is described in detail in U.S. Pat. Nos. 4,679,137, 4,805,89, 4,843,538, 4,873,623, and 4,951,190.

Using the CDF three level dynamic menu 96, the user selects a process. At this point the user may either create or modify the selected process definition 80, he/she may run the selected process so as to perform measurements on a particular specimen (i.e., wafer), or the user may analyze data collected using the specified process by accessed corresponding sets of stored data in the system's database 82.

As shown in FIG. 7, the system hierarchy 90 contains one more level below the process selection level. In particular, any particular process may perform a number of different measurements at each of a number of sites on a specimen. For instance, the process might perform electrical measurements on three or four different device structures within each die on a semiconductor wafer. Each of these distinct measurements is called a measured parameter that can be separately tracked and analyzed by the system. The present invention provides two types of parameters that can be generated and stored by a process: (1) measurement parameters, which are essentially raw measurement data, and (2) calculated parameters, which are specified mathematical combinations of the measurement parameters. For instance, when using a process that makes four resistance measurements (herein called R1, R2, R3 and R4) at each wafer site, each comprising a distinct measurement parameter, the user might want to track (a) the average of these four measurement values and (b) the peak one of the four resistance values. Thus the user would define two calculated parameters:

A) (R1+R2+R3+R4)/4
B) MAXIMUM(R1, R2, R3, R4)

For each such parameter, the system can generate a trend chart, a wafer map. a histogram. and possibly other data analysis charts. Since each such data analysis chart has various parameters that define how it is displayed (how it is scaled, axis definitions, and so on), the system stores a set of data analysis chart definitions 98 for each defined parameter. Initially, the system defines a default set of data analysis chart definitions when the process is first defined. Later, while viewing such data analysis charts or while modifying the process definition, the user may modify or customize these data analysis chart definitions to suit his/her particular needs. For example, for a wafer map of resistivity measurements, one must define the interval (e.g., percentage difference between resistivity values) between contour lines. See Table 18 of U.S. Pat. No. 4,873,623 for a specific example of the parameters stored to define a set of data analysis charts for one particular parameter of a specified process.

For processes which measure more than one parameter, when the user wants to perform a data analysis task (such as viewing a trend chart), the user must select which parameter is to be analyzed. Upon making that selection, a default display, such as a trend chart for the selected process/parameter is generated, as shown in FIG. 4. From there the user can select other data analysis options.

OVERVIEW OF DYNAMIC MENU OPERATION

As mentioned above, one selects a process for either data collection or data analysis using a three level dynamic menu shown as display 94 in FIG. 7. The following is brief description of the operation of this user interface.

A three level dynamic menu has three menu display regions (C, D and F in FIG. 7), herein called a group or cabinet menu (C), a subgroup or drawer menu (D), and an object or folder menu (F). In the preferred embodiment, each cabinet contains up to nine drawers, and each drawer contains up to nine folders. In other embodiments, the number of items under any menu could be unlimited, with the menus acting as windows which scroll up and down over the complete list of items in the menu. There is also a pointer associated with each menu region which indicates what item in each menu has been selected. In the preferred embodiment, selected menu items are highlighted.

The subgroups shown in the second menu region (D) are the subgroups which are associated with the group being pointed to in the first menu region. The items shown in the third menu (F) are the items associated with the subgroup being pointed to in the second menu region.

When the pointer in the cabinet menu region is moved, the drawer menu is automatically replaced with subgroup items associated with the group item being pointed to in the first (cabinet) menu region. Similarly, the third menu region is replaced with names associated with the new subgroup item being pointed to in the drawer menu display region.

DATA STRUCTURES

In the preferred embodiment, for each system user 94, data structures are defined and stored for 729 (i.e., $9 \times 9 \times 9$) predefined processes which are organized into nine supergroups and eighty-one groups of processes, where each such group contains nine processes. These data structures are initially defined by the engineering set up module 26 (see FIG. 1) and then are stored on a fixed or portable disk 40 or 41 for later use. When the operator control module 28 is turned on, the process definition data structures (but not the measurement data structures) for a specified system user are copied into the computer's memory for use by the operator control module 28.

PROCESS NAMES AND AVAILABILITY FLAGS

For each process, process group and process supergroup there is assigned a name and an availability flag. The names are simply the names that appear in the process selection menus, an example of which is shown in Table 1. The availability flag for each process and group determines whether the process or group is available for use by the operator. The engineer defining the processes to be used can use the availability flags to deny a specific operator (i.e., the users of a specific disk 41) access to the corresponding process, group or supergroup of processes. This is useful, for example, if a certain operator is authorized only to perform tests on certain types of wafers, or if a process has not yet been debugged but the engineer wants to use it on an experimental basis with only certain more highly trained personnel.

Figure 8A:
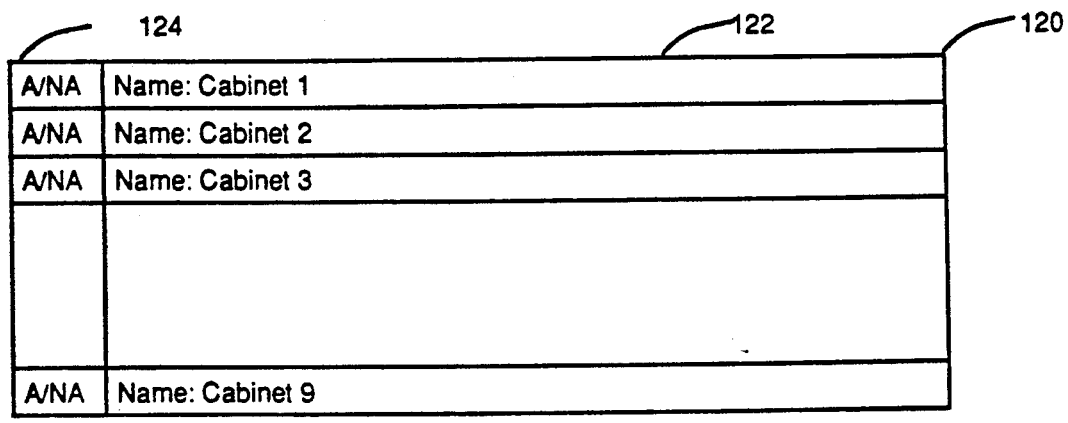
FIGS. 8a–8c depict the data structures used for defining process names in the preferred embodiment.

Referring to FIG. 8a, the SuperGroup Prompt data structure 120 contains a set of nine process supergroup names 122, each up to twenty characters long, and a set of nine corresponding group availability flags 124. The supergroup names 122 show up in the cabinet menu of the operator's process selection screen, as shown, for example, in Table 1 during the process selection step described above. Each supergroup availability flag is equal to 0 if the corresponding supergroup is available for use by the operator and is equal to 1 if the supergroup is not available.

Figure 8B:
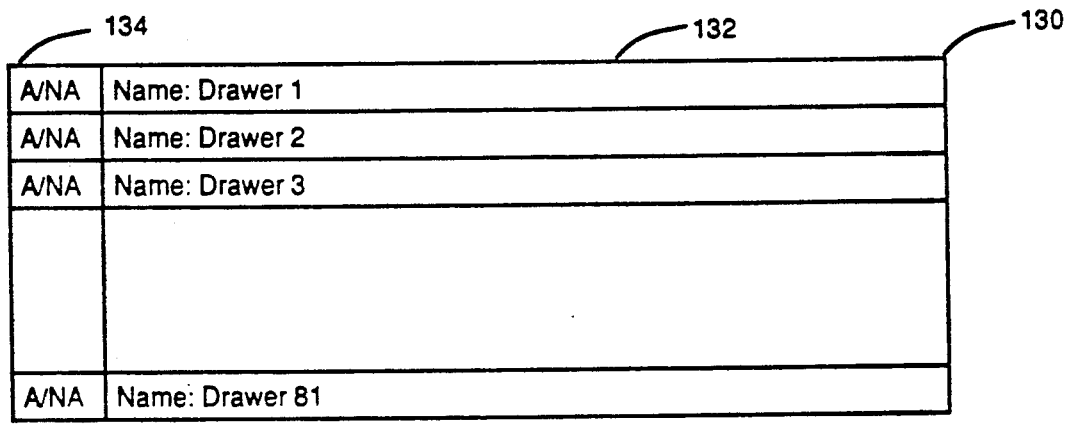

Referring to FIG. 8b, the Group Prompt data structure 130 contains a set of eighty-one process supergroup names 132, each up to twenty characters long, and a set of eighty-one corresponding group availability flags 134. The first nine group names belong to the first supergroup, the next nine group names belong to the second supergroup, and so on. The group names 132 show up in the drawer menu of the operator's process selection screen, as shown, for example, in Table 1. Each group availability flag is equal to 0 if the corresponding group is available for use by the operator and is equal to 1 if the group is not available.

Figure 8C:
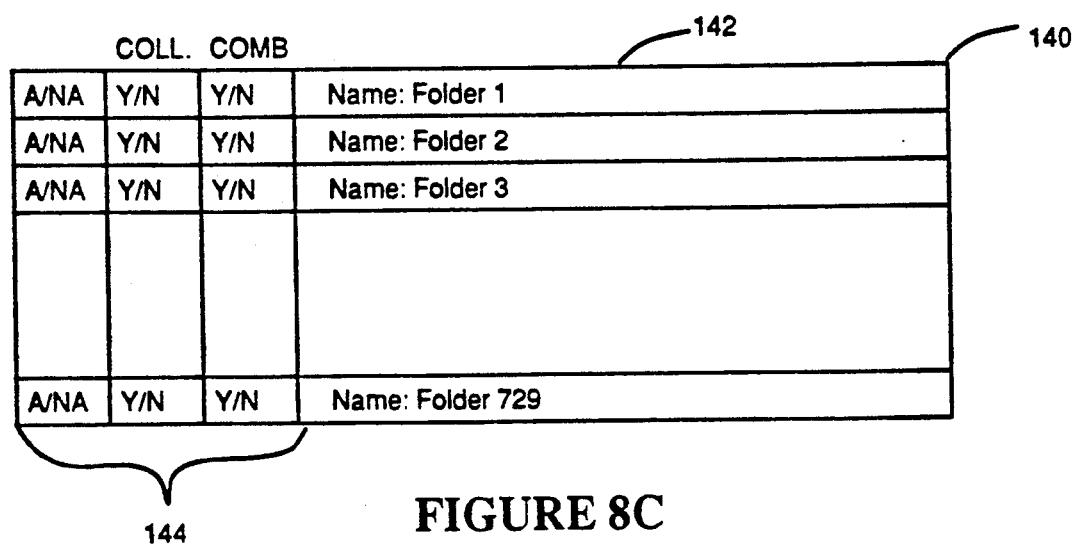

Referring to FIG. 8c, the Process Prompt data structure 140 contains a set of 729 process names 142 and a set of corresponding process availability flags 144. The first nine process names belong to the first group, the next nine process names belong to the second group, and so on. The process names 142 for a selected group show up in the folder menu of the operator's process selection screen, as shown, for example, in Table 1.

In the preferred embodiment, each process availability flag actually contains three flags: (1) an operator availability flag which is equal to 0 if the process is available for use by the operator and is equal to 1 if the process is not available; (2) a collection flag which is equal to 0 if data collection is allowed, and 1 if data collection is not allowed; and (3) a combine on/off flag which is equal to 1 if creating new data files in the corresponding folder by combining other data files is allowed, and 0 if data combining is not allowed.

If the process/operator availability flag is off, the folder's name does not even appear on the operator's process selection menus. Even if the process is available, the collecting new data is permitted only if the collection flag is enabled; similarly combining data sets is allowed only if the combine flag is enabled.

PARAMETER FORMATS AND DATA STRUCTURES

Figure 9:
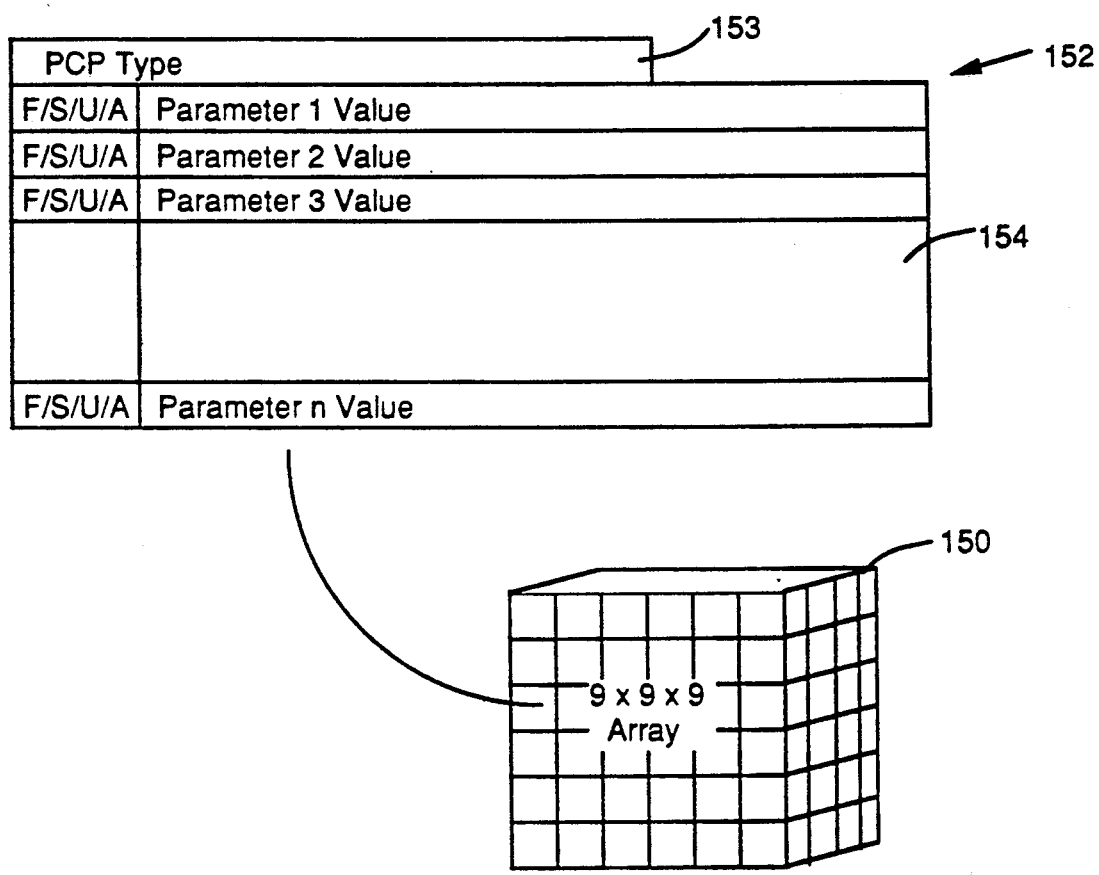
FIG. 9 depicts the data structures used for defining processes in the preferred embodiment.

Referring to FIG. 9, the Process definition data structure 150 is used to store the parameter values for all the predefined processes. Conceptually, the Process definition data structure 150 comprises a $9 \times 9 \times 9$ array of process parameter data structures 152. Each process definition data structure 152 contains an indicator (PCP Type) 153 of the process control program associated with the process, and the default values 154, if any, of all the variable parameters associated with the corresponding folder. This data structure 152 defines the process type, parameter default values, and operator control level for each parameter.

In the preferred embodiment, the format of the Process definition data structure is the same for every process (i.e., for every folder), regardless of the process control program selected. In addition, the process parameter data structure 152 includes all the parameters needed for all the available processes. Thus, some of parameters stored in structure 152 are used by more than one of the available processes while others are used only for a particular process. The advantage of this data structure is that (1) the data structure need not be replaced when the engineer selects a new process type, and (2) if the engineer is experimenting with two or more process types, the stored default values for each process are preserved when the engineer shifts between different process types. In other words, if the engineer first set up a particular folder for CONTOUR MAPPING, then changed his mind and began setting it up for a QUICK TEST, but then went back to CONTOUR MAPPING, the default values originally entered would not be lost.

MEASUREMENT DATA STRUCTURES

Figure 10:
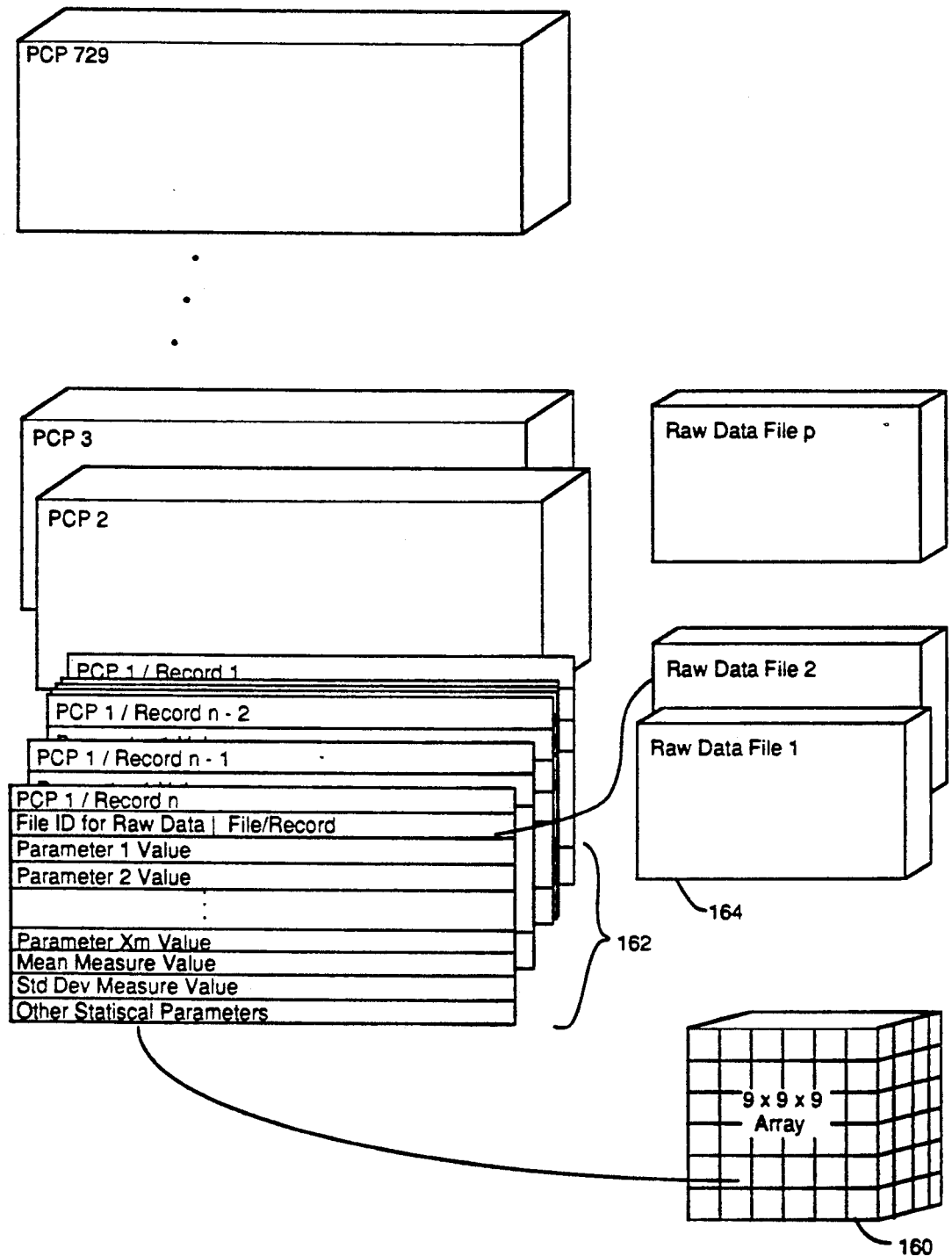
FIG. 10 depicts the data structures used for storing measurement data and related information.
Figure 11:
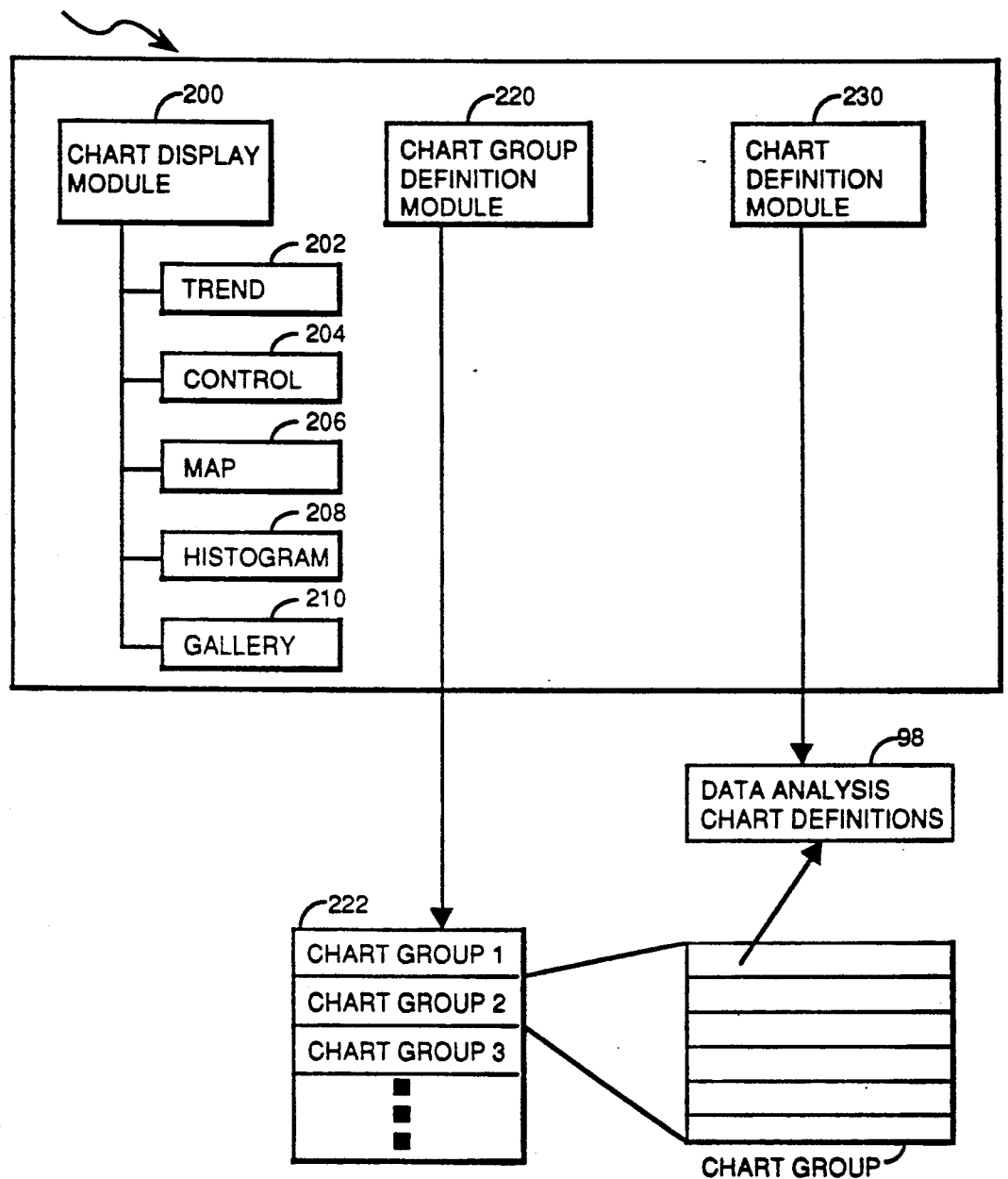
FIG. 11 is a detailed block diagram of software in the engineering set up module of the preferred embodiment.

Referring to FIG. 10, the Measurement data structure 160 is used to store the measurement values generated by each of the predefined processes. Conceptually, the Measurement data structure 160 comprises a $9 \times 9 \times 9$ array of measurement data structures. Actually, in one preferred embodiment, for each process there is one measurement file 162 and also a set of raw data records in another file 164. Both files contain one record for each data collection run performed using the corresponding process. Also, the records in the file 162 are kept in chronological order.

The records of the first file 162 contain the parameters used to set up and run the process (i.e., the parameter values entered by the operator and the engineer who set up the process), and data derived from the raw measurement values in file 164 including the mean resistivity value, the standard deviation of the measured values, and several other statistical parameters. Since each file 162 is associated with a particular process, and the number of parameters for the process is known, the system can directly access the statistical information at the end of each record (e.g., for generating trend charts and control charts) simply by indexing into each record to the appropriate depth.

Storage of the process definition parameters in the measurement data file 162 provides automatic documentation of the data, and allows detailed data analysis by the engineer using a data base management program.

Each record in file 162 also contains a file identifier which specifies the file and record in which the raw measurement data for the run is stored. In the preferred embodiment, the file identifiers are simply a set of sequentially increasing numbers (i.e., 00001,00002, . . . ). Every time a file is created, the next sequential number is used as its name. Thus, even though each folder (i.e., process) has separate set of files with increasing file numbers, the file numbers for any one process will not be sequential if the use of the different processes is interleaved.

In one preferred embodiment, there is a separate raw data file 164 for each data record length used. Thus the raw data for all processes which generate 121 data points (i.e., measure the resistivity of the wafer at 121 sites) are stored in one file 164, the raw data for all those which generate 225 points are stored in a second file 164, and so on. This scheme is used because it allows the use of fixed length record files, which provide fast access and are easier to set up than variable length record files.

In other preferred embodiments, storage of measurement data is handled by a commercial (i.e., publicly available) database management system, such as Oracle ™ or MDBS IV ™. In such embodiments the exact location of each record of measurement data is not particularly relevant. All that is important is that the database management system be able to quickly access and retrieve all the records of measurement data for a specified process.

CHART GROUPS

As explained above, a chart group is a list of measurement data sets that are grouped together for convenient access. Since each measurement data set has its own data analysis charts, a chart group can also be though of as a set of data analysis charts, where each data analysis chart contains the data for a corresponding measurement process (i.e., for a corresponding set of measurement data).

Referring to FIGS. 11, 12, 13 and 14, one of the functions of the engineering module is to define chart groups. The engineering module software, shown in FIG. 11, includes a chart display module 200, which includes routines 202-210 for generating and displaying trend charts, control charts, data/wafer maps, histograms and "galleries" of data maps. Operation of the gallery display routine 210 is explained in more detail below.

Group definition module 220 is used to define chart groups and to store a chart group definition data structure 222 in the computer system's memory. The group definition structure includes a listing of the names of each defined chart group, and for each group includes a listing of the "path" for each member of the group. A "path" is the specification of the system/account, cabinet/drawer/folder and parameter for each set of data that is included in a chart group. That is, a "path" specifies the measurement data for a particular parameter measured by a specified process.

Chart definition module 230 defines and stores a set of data analysis chart definitions 98 for each defined parameter of each defined process.

Chart Group Definition

Figure 12:
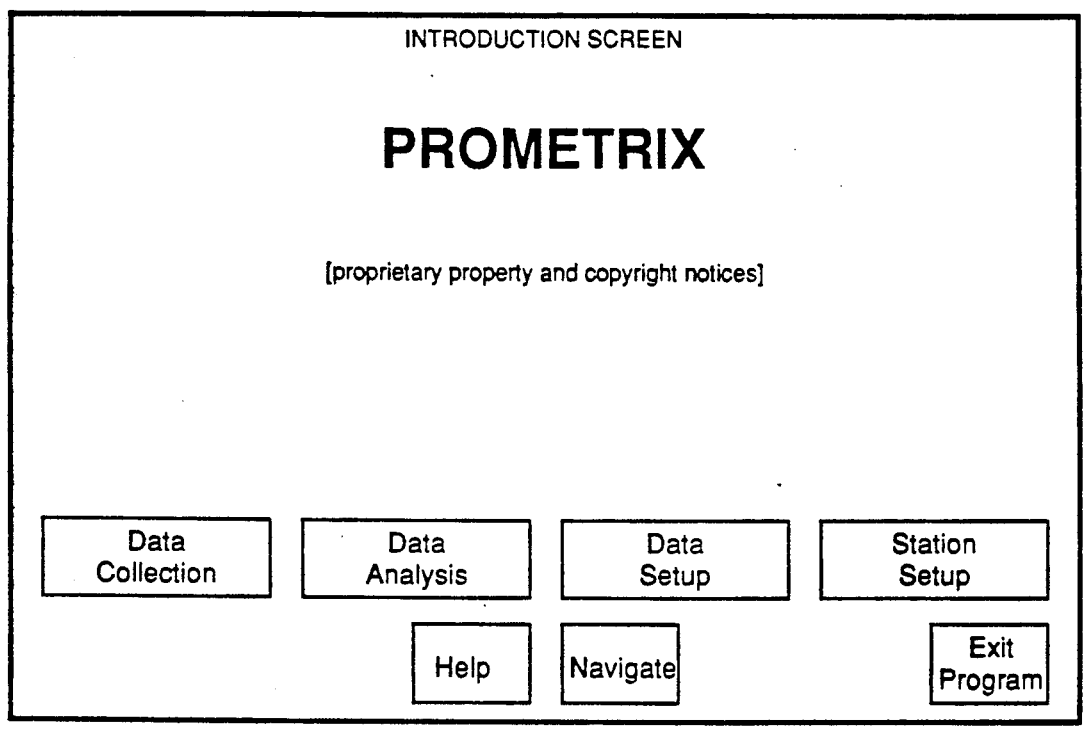
FIG. 12 depicts the main menu screen used in the preferred embodiment of the present invention.
Figure 13:
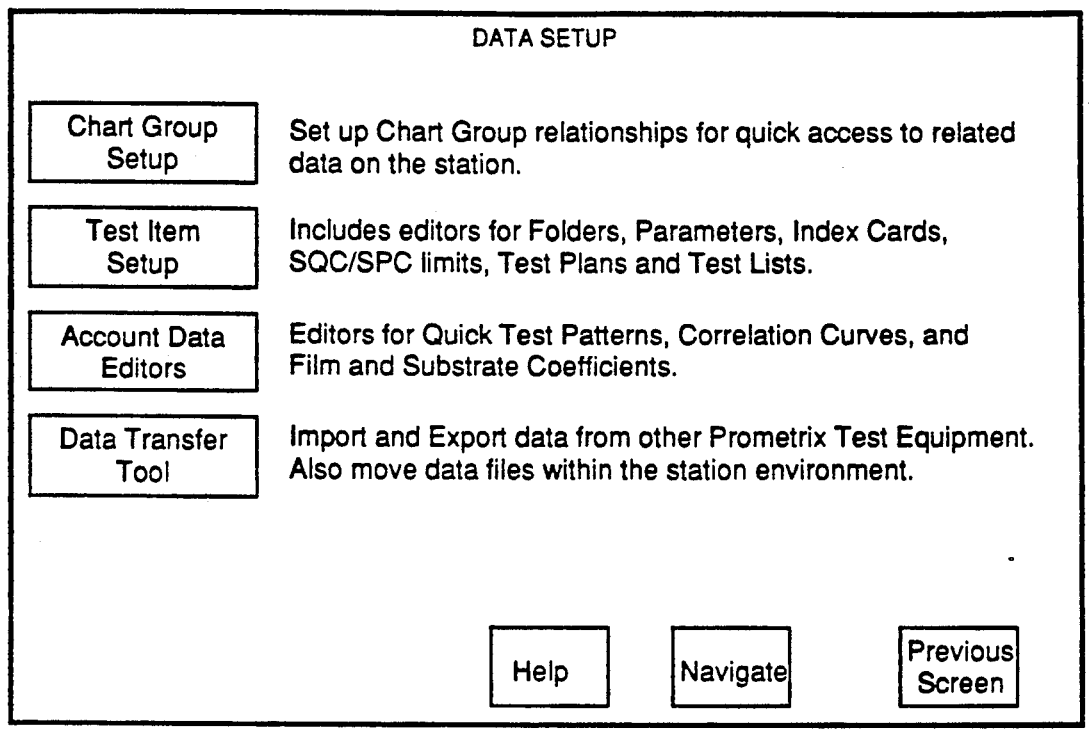
FIG. 13 depicts a data setup task selection menu.

To create or edit a chart group, one begins at the system's main menu, shown in FIG. 12, by selecting with the "data setup" option. This brings the user to the data setup menu shown in FIG. 13, from which the user selects the "Chart Group Setup" option, bringing the user to the "Chart Group Menu" of FIG. 14. As one can see from the options at the bottom of the menu, one can use this menu to create, delete, rename, display or edit a chart group. Creating a chart group simply involves selecting a group name and setting aside space in the system's memory for storing a chart group definition. From that point on, creating a chart group is the same as editing an existing group. Therefore we will follow the methodology for editing an existing chart group. For instance, we will show how to add several items to a chart group.

Figure 14:
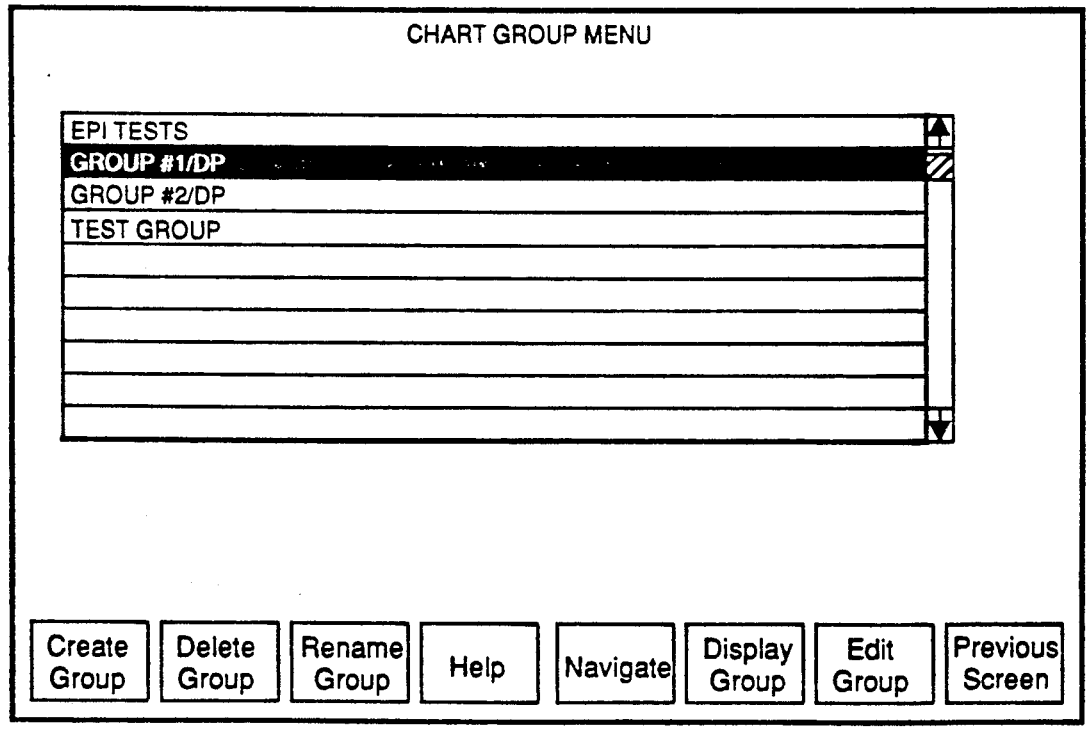
FIGS. 14, 15, 16 and 17 depict a sequence of menu screens used to define chart groups.
Figure 15:
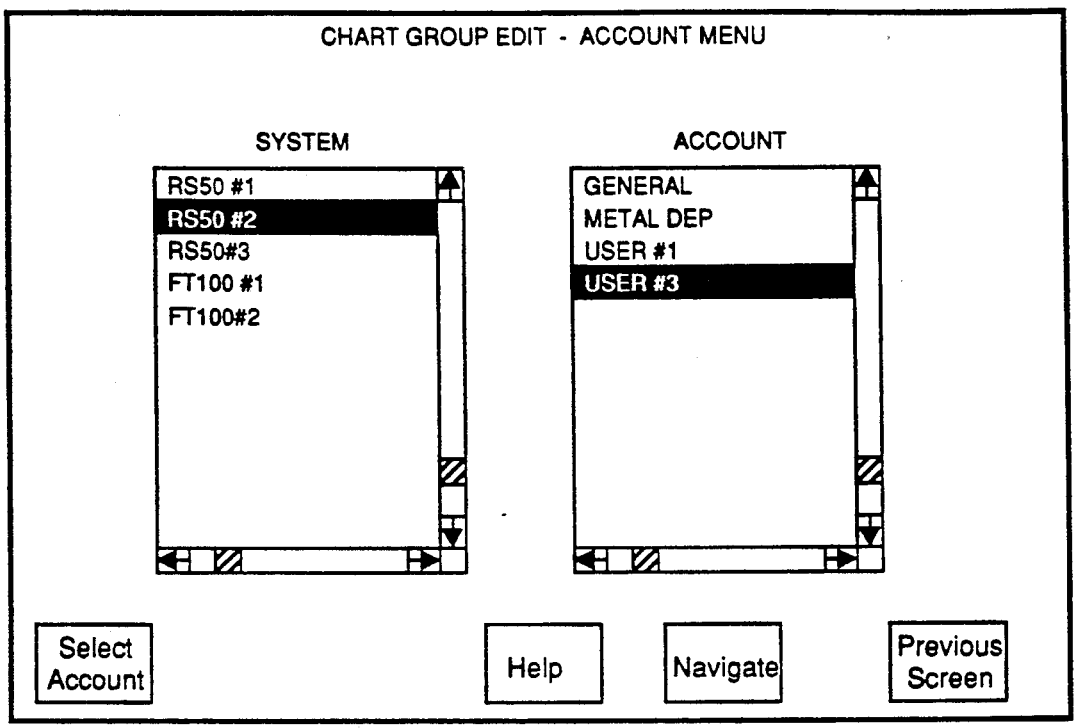

After selecting a chart group from the menu in FIG. 14, one selects a system and account from the Chart Group Edit—Account Menu of FIG. 15. In other words, the user selects the system and account for an item to be added to the chart group. This selection is made using the two level dynamic menu shown in FIG. 15. For whichever system the user selects in the "system" menu, the computer system automatically displays the corresponding accounts in the "account" menu. The user then selects an account from the account menu and activates (e.g., by clicking the computer's mouse) the Select Account option, which causes the computer system to display the menu in FIG. 16.

Figure 16:
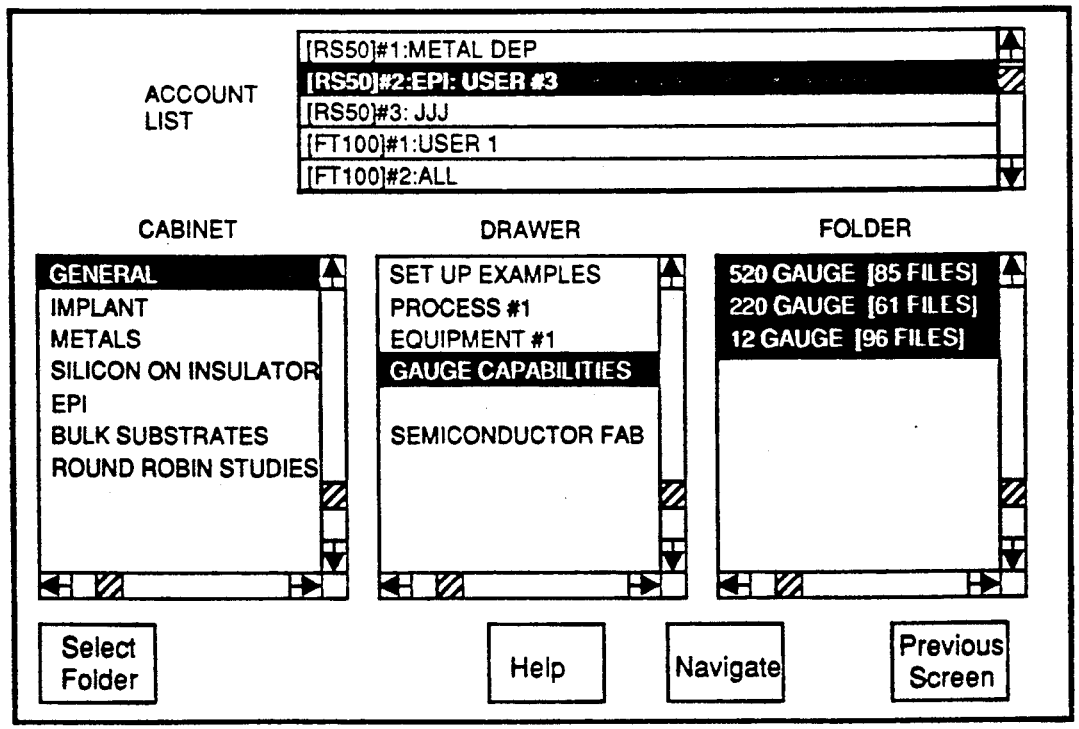
Figure 17:
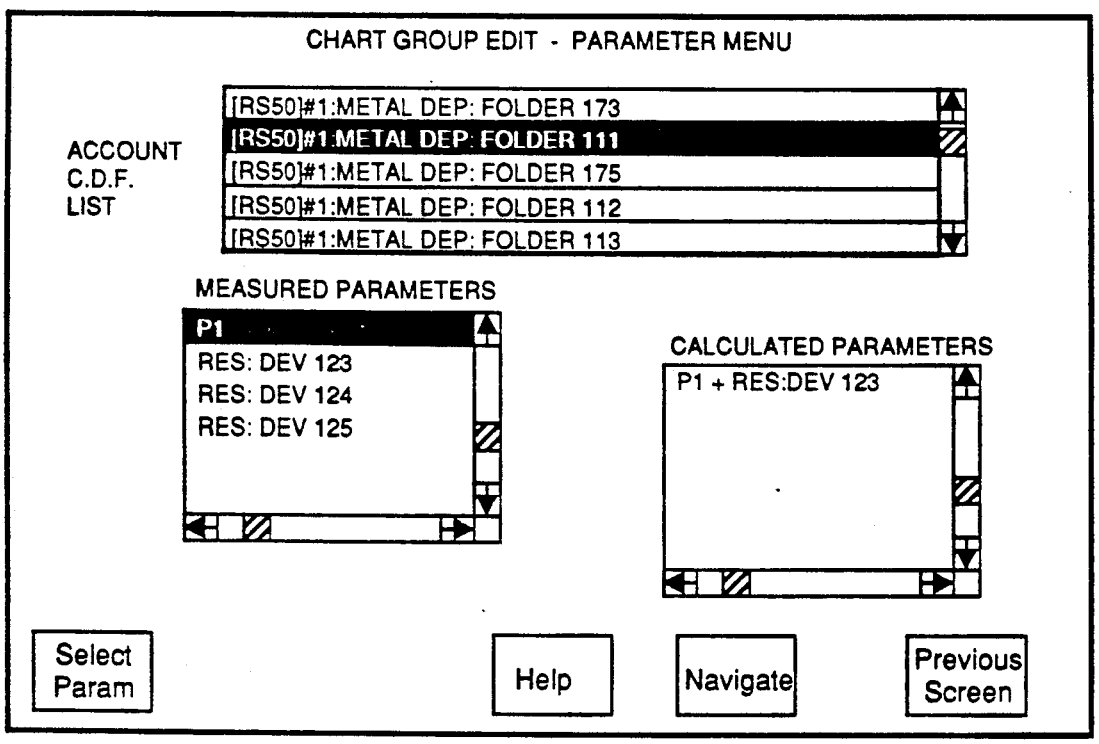

FIG. 16 is the folder selection menu, from which the user selects one or more folders using a three level cabinet/drawer/folder menu, as described above. For each selected folder, if the folder's process produces more than one parameter (including both measurement parameters and calculated parameters), then the system displays the parameter selection menu shown in FIG. 17. Each measured and calculated parameter is the subject of a distinct set of charts, and is treated as a separate item that can be added to a chart group. For folders which have only one parameter, that parameter is automatically selected and FIG. 17 is not needed.

Once a folder and parameter have been selected, a display similar to the one shown in FIG. 4 is generated. The top menu 60 in this Figure lists all the charts which are members of the selected chart group. Whenever an item from this menu is selected, the corresponding control chart or trend chart is displayed. If the user wants to delete this chart from the group, the "Discard Chart" command is used. Descriptive names can be assigned to particular charts by using the "Rename Chart" command. The "Save Group" commands commits to permanent storage the current definition of the chart group.

Viewing a Chart Group

Figures 18, 19:
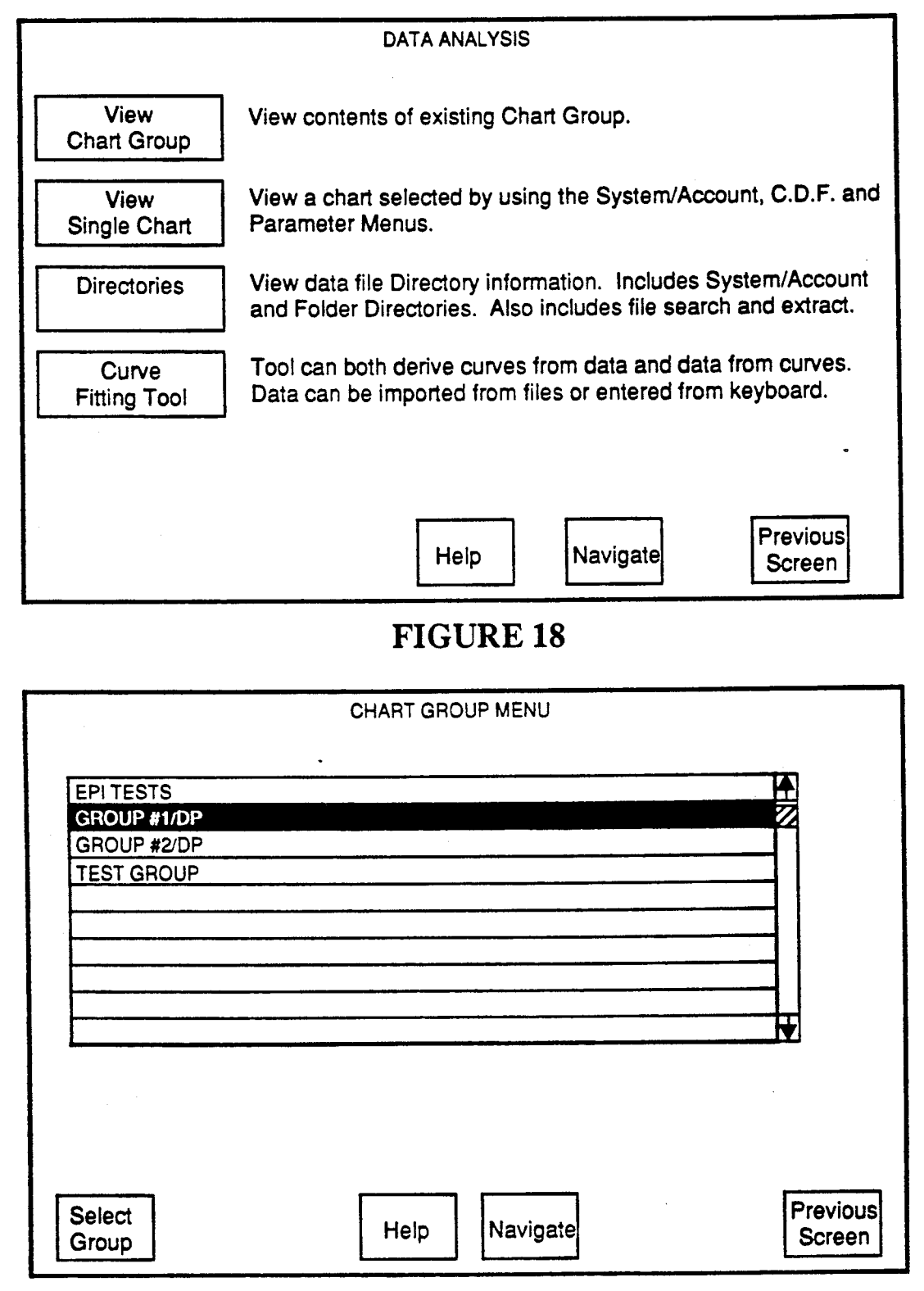

To view data analysis charts from a chart group, one selects the "data analysis" command from the main menu of FIG. 12, which causes the system to generate the Data Analysis menu shown in FIG. 18, and then selects the "View Chart Group" command from the menu in FIG. 18. This sequence of selections produces the display shown in FIG. 19, from which the user selects the chart group to be viewed, which selection causes the system to generate a display configured as shown in FIG. 4. From FIG. 4 the user selects items (i.e., data analysis charts) to be displayed.

Referring to FIG. 5, two trend or control charts can be viewed simultaneously by selecting the "Show 2 Charts" command/option from pull-down menu 70, and then selecting two items from the "C.D.F." menus at the top of the resulting display 60, as shown in FIG. 20. The NEXT CHART and PREVIOUS CHART buttons below the displayed trend chart are a very useful alternative to the CDF selection menu 60, since they allow rapid paging through the data sets in the selected chart group. In particular, activating the NEXT CHART button (using a mouse 35) selects the next sequential chart in the group, while activating the PREVIOUS CHART button the previous chart in the group.

The "Show 2 Charts" command causes the previously shown trend chart to be compressed in the vertical dimension, and also compresses the "C.D.F." chart selection menu, allowing enough room to show a second trend chart and a corresponding "C.D.F." chart selection menu. Also shown in FIG. 20 is the feature that a wafer map can be superimposed on the display for a selected datum in each trend chart. In other embodiments of the invention, it would be possible to simultaneously display three or even more such charts, given a sufficiently large display with sufficient resolution.

VIEWING A SINGLE SPECIFIED DATA ANALYSIS CHART

To view a particular data analysis chart, such as a trend chart, without using the chart group feature, one selects the "data analysis" command from the main menu of FIG. 12, and then the "View Single Chart" command from the menu in FIG. 18. This sequence of selections produces a display similar to the one shown in FIG. 15, from which the user selects a system and account, and then FIG. 16, from which the user selects a process (i.e., a folder), and then FIG. 17, from which the user selects a parameter. This selection process causes the system to generate a display of a single trend chart, as shown in FIG. 21.

TREND CHART—EXPAND BAR

Figure 21:
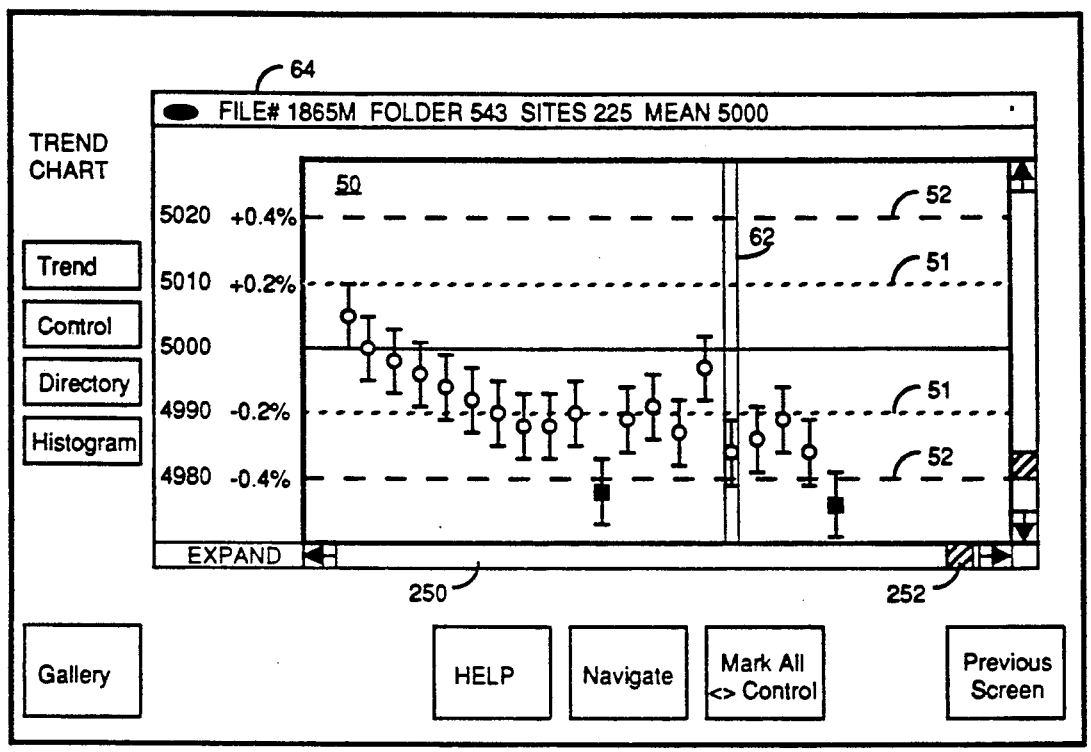
FIGS. 21 and 22 depict two views of the same control chart with two different settings of the Expand Bar feature of the present invention.
Figure 22:
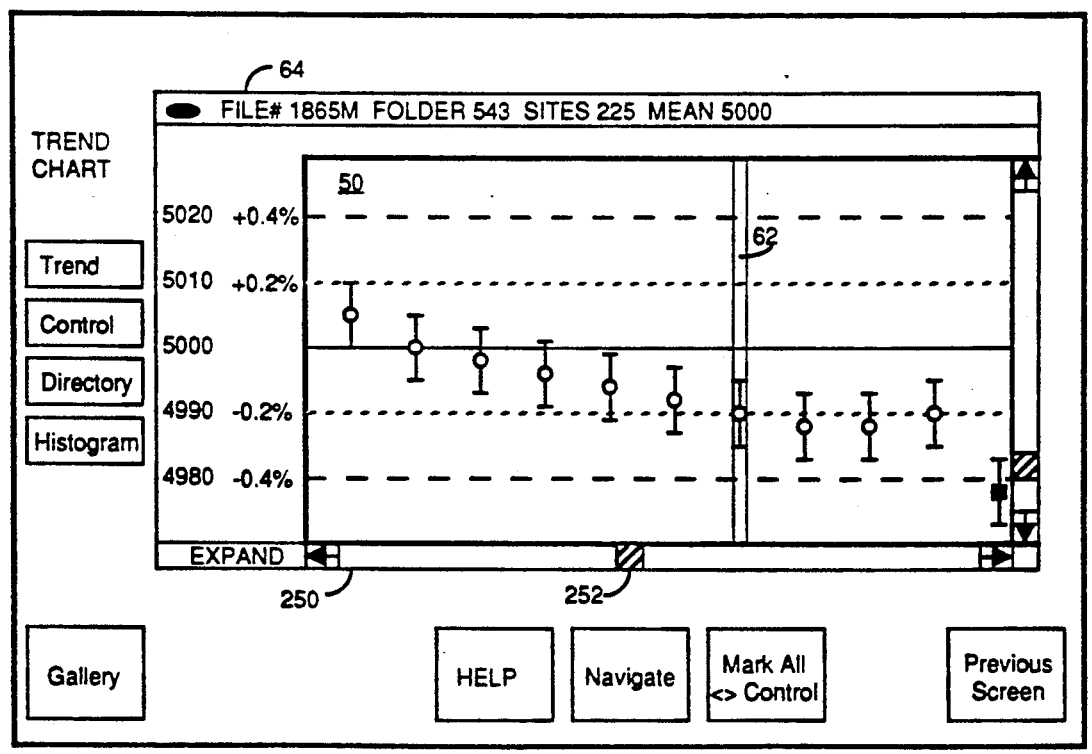

Referring to FIGS. 21 and 22, each control and trend chart is displayed with an Expand Bar 250 at the bottom of the chart. The expand bar has a expansion selection element 252, sometimes called a thumb, positioned at a position between its two ends, which the user can move to various positions along the expansion bar. The chart display routine 200 in the Engineering Module 26 scales the displayed data analysis chart in accordance with the position of the expansion selection element (thumb). When the thumb is all the way to the right side of the expansion bar 250, which is its default position, the displayed data is compressed so as to display all data from the selected folder/parameter. When the thumb is all the way to the left of the expansion bar, the displayed data is expanded so that only one data point is displayed. At positions between the two extremes, the display is scaled so that the percentage of the entire chart which is displayed is approximately equal to the percentage of the expansion bar 250 which is to the left of the thumb 252. Thus, the distance between data points increases as the expansion thumb is moved to the left.

Another method for rescaling provided for rescaling trend charts is as follows. The user selects the ZOOM command from menu 70 (shown in FIG. 5) and then drags the mouse 35 to define a dotted capture box comprising a portion of the displayed trend chart. When the user lets go of the mouse selection key, the selected region of the trend chart is resized to fill up the entire chart display area. The left and right edges of the capture box define the beginning and ending data points for the revised chart window, while the upper and lower edges define upper and lower limits from the chart window. The UNZOOM command in menu 70 is used to return the display to the normal, automatically scaled trend chart.

GALLERY OF DATA MAPS

The Gallery feature of the present invention is, in essence, a graphic spreadsheet program. Each cell in the Gallery is a graphic image, and new cells can be defined as mathematical or statistical combinations of other cells. Furthermore, the present invention provides tools to make it easy to manipulate the graphic images in cells, to define new cells, and to perform various types of data analyses on the data shown in the cells.

Figure 23:
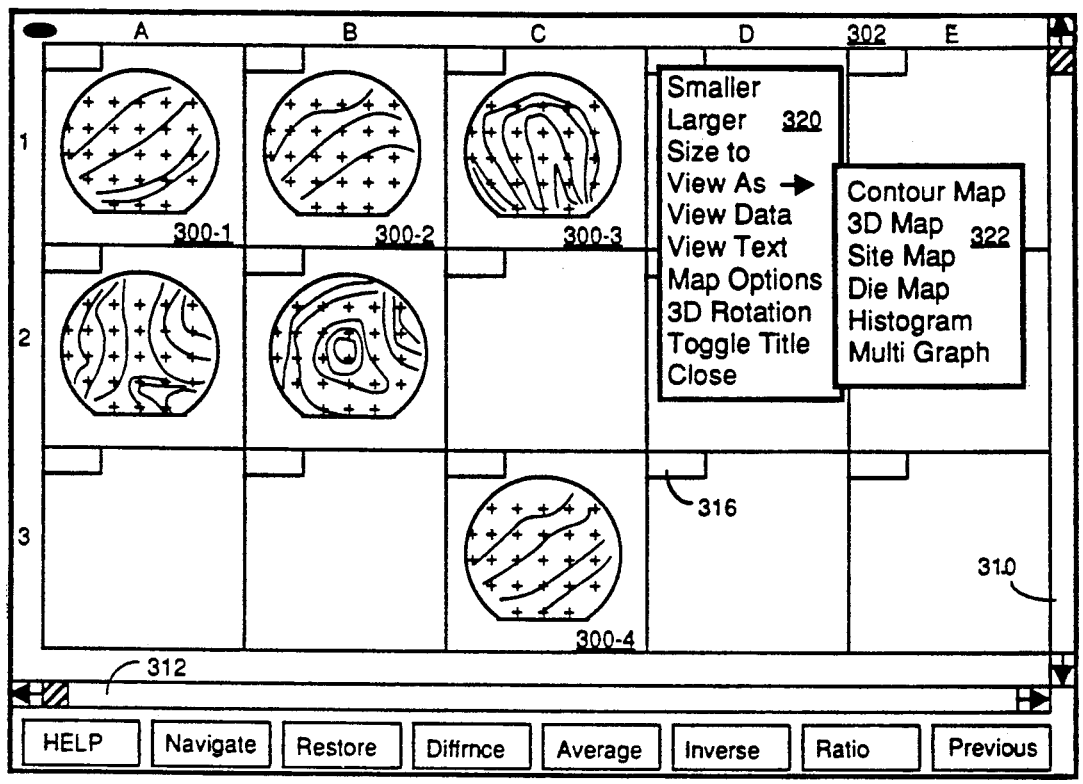
FIGS. 23–28 depict galleries of data maps in accordance with the present invention.

Using the chart group display of FIG. 4, a user can select a number of data points from a control chart or trend chart (shown as dark, square data points in FIGS. 4 and 20) and then execute the Gallery command, to produce a display such as that shown in FIG. 23 under control of the gallery display routine 210. In particular, it can be seen in FIG. 20 that three points have been selected in the upper of the two displayed trend charts and that two points have been selected from the lower of the two displayed trend charts. Contour maps for these five selected data points are displayed in Gallery form when the Gallery command is selected, producing a display as shown in FIG. 23.

Every cell 300 in the Gallery display 302 of FIG. 23 can be defined as either a particular set of measurement parameter or calculated parameter values (i.e., one wafer's values for a defined parameter), or as a combination of two or more such sets of values. For instance, the cell 300-4 in Row 3, Column 3 of the Gallery in FIG. 23 is defined as being the average value of the displayed data shown in cells 300-1 and 300-2 (Row 1, Columns 1 and 2).

The purpose of the Gallery display is to allow visual data comparison of data maps, as well as to allow a user to peruse a number of related data maps without having to go through a large number of maneuvers with the computer to move among data maps. If the number of cells in the Gallery exceeds the number that can be viewed at any one time, the vertical and horizontal scroll bars 310 and 312 on the edges of the Gallery can be used to scroll the display so as to bring any particular cell into view.

An important feature of the present invention is that the contents of selected cells can be easily defined as a specified function of other cells using just a few clicks of the system's mouse 35, unlike most "spreadsheet" type programs which require the use of a programming language. In particular, the user may simply select one or more cells, by pointing to them with a mouse and then clicking the mouse's selection button, and then select one of the commands on the bottom line of the gallery. For instance, Cell C,3 was defined by first selecting Cells 1,A and 1,B on the first row of the Gallery, then selecting the AVERAGE command on the bottom line of the gallery, and then clicking on Cell C,3 to specify where the average of Cells 1,A and 1,B should be displayed.

When using the Gallery, cells selected by the user (by clicking the system's mouse 35 while pointing at the cells) are distinctly highlighted to indicate those cells that are to be the subject of a particular mathematical or statistical operation (also selected by the user by clicking on a box under the Gallery, or by pulling down a menu from the dialog box 316 in any cell). After the operation on the selected cells is performed, highlighting is automatically removed. This allows new cells to be defined quickly and intuitively in conjunction with the labelled buttons (e.g., DIFFERENCE, AVERAGE, INVERSE) at under the Gallery.

Another important feature of the Gallery is that every cell in the Gallery is a fully functional data analysis unit. This means that one can use each cell to view its assigned data in various forms, such as viewing the data as a three-dimensional map or as a list of measurement raw data values, to make the displayed map larger or smaller, or to combine the data in one cell with data in another cell.

Data viewing options for any particular cell are accessed by clicking on the dialog box 316 at the top left corner of the cell, which brings down a menu 320 of display options. From that first menu 320, the user can access a number of submenus, such as the "View As" submenu 322 shown in FIG. 23, which allows one to redisplay a wafer map as a 3D map, Site Map, etc. Each cell can also be resized, using the Smaller, Larger and Size To options. Thus, one cell 300 can be made very large for close inspection, and then resized back to its original size in the gallery. The display options for multiple cells can be changed simultaneously by first selecting all the cells that the user wants to share display attributes, then pulling down the menu 320 from the dialog box 316 on any of the selected cells and selecting an attribute (such as "3D map"). All the selected cells will then be changed in accordance with the selected attribute.

In the preferred embodiment, operators may append a text messages to measurement records, for instance, to indicate when the manufacturing process has been changed or to indicate any other unusual circumstances. Measurement data records having such appended messages are displayed as data points in trend charts (such as those shown in FIGS. 4-6 and 20) using a distinct color (e.g., yellow instead of blue). In an alternate embodiment, other types of special symbols could be used to identify measurement records with appended text. The text appended to these records can be viewed by selecting the corresponding points in the trend chart, selecting the Gallery command, and then using the View Text command from menu 320. Gallery cells with text typically must be expanded using the LARGER menu command to allow easy reading of the text. To facilitate selecting records with text, the trend chart menu 72 shown in FIG. 5 includes a MARK CHARTS W/TEXT option.

Figure 24:
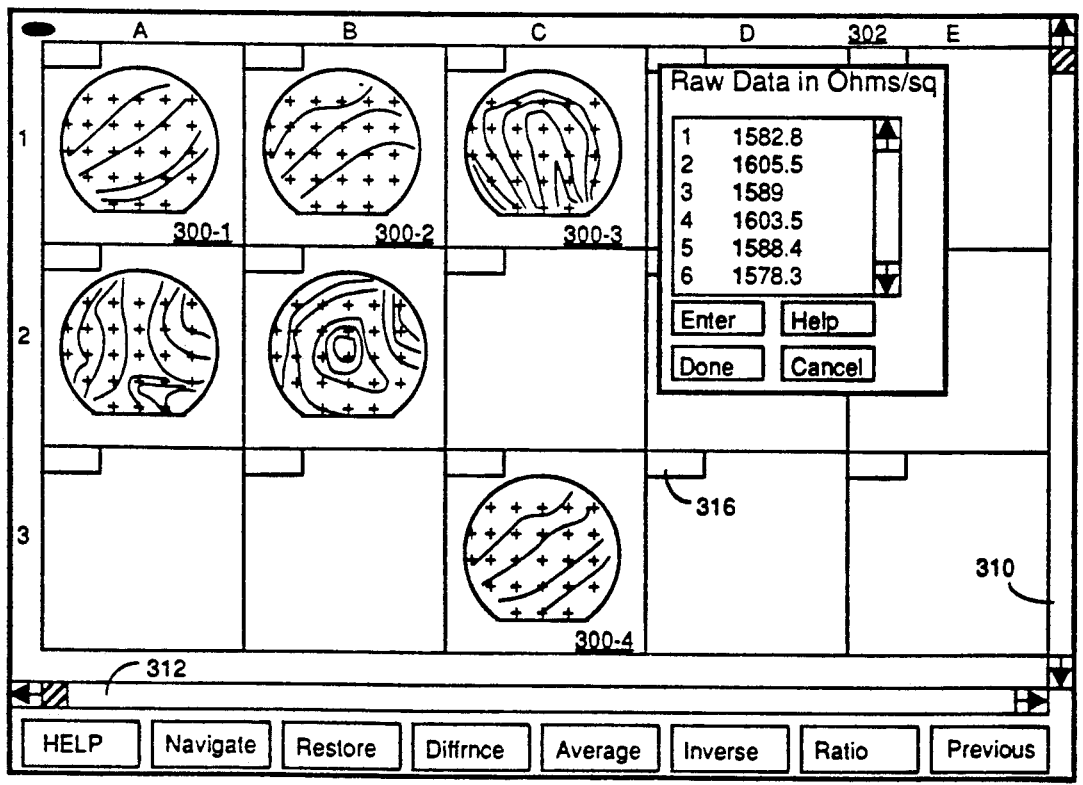

FIG. 24 shows the display generated by selecting the View Data option from menu 320. This option or command allows the user to review the raw measurement values previously displayed in wafer map form.

Figure 25:
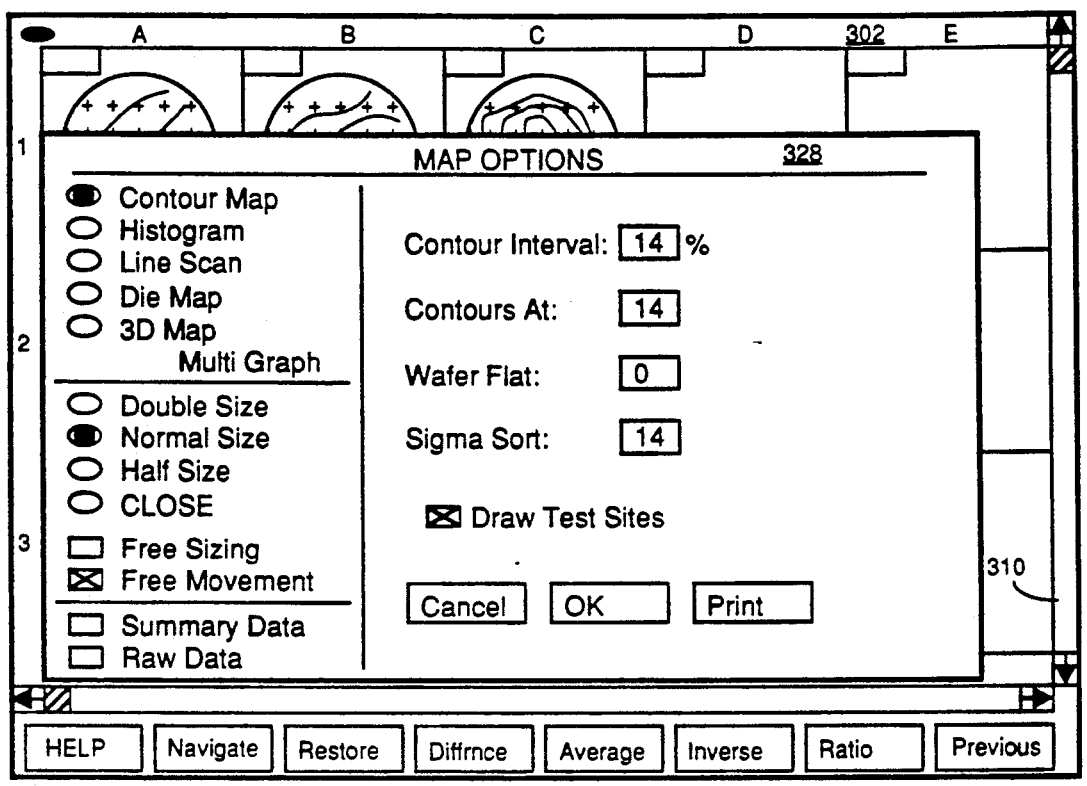

FIG. 25 shows the display generated by selecting the Map Options command from menu 320. The Map Options menu 328 gives the user a full range of map definition options, allowing the user to define the type of data analysis image to be generated for the selected cell.

Figure 26:
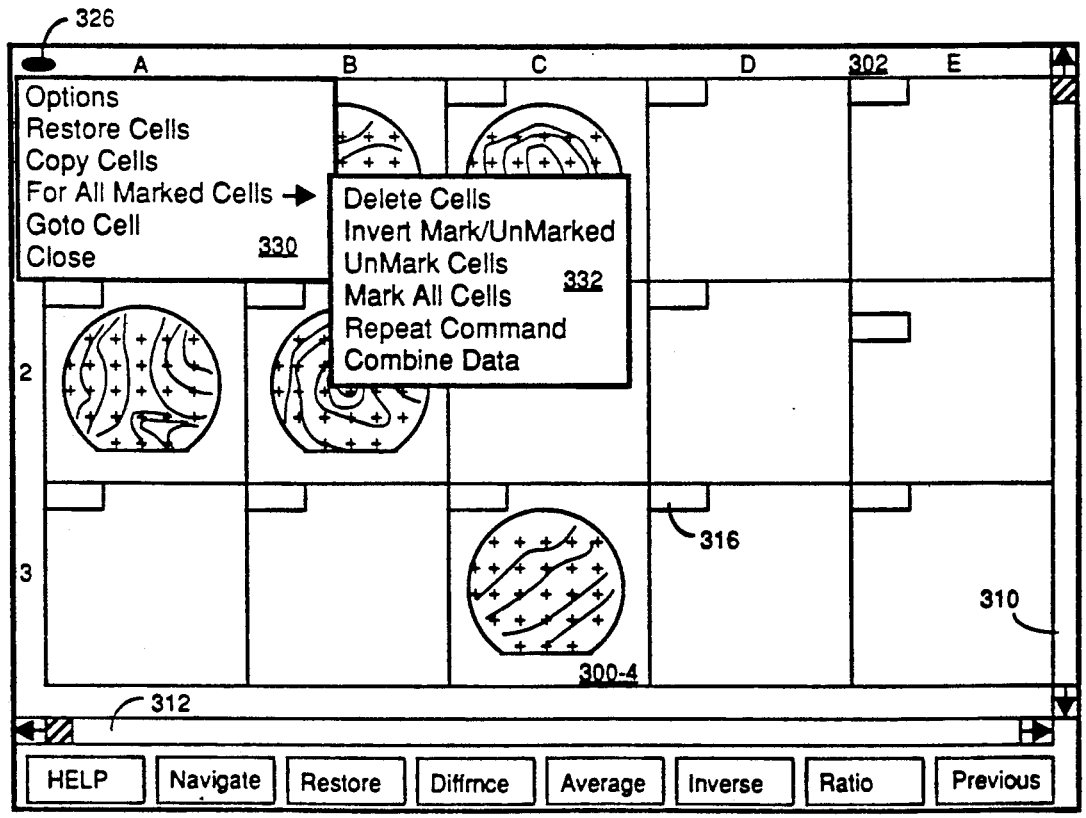

As shown by FIG. 26, other data analysis options are selected by clicking on the icon 326 at the top left corner of the Gallery chart, which pulls down the menu 330 shown in FIG. 24. From menu 330, the user can access a submenu 332 for performing various functions on selected cells, called "marked" cells in the preferred embodiment of the Gallery display software 210 (because selected cells are visually "marked" so that the user can remember which cells have been selected. As shown, the Gallery display software 210 will delete cells, copy cells, invert data, combine data and so on in accordance with the options selected by the user.

Figure 27:
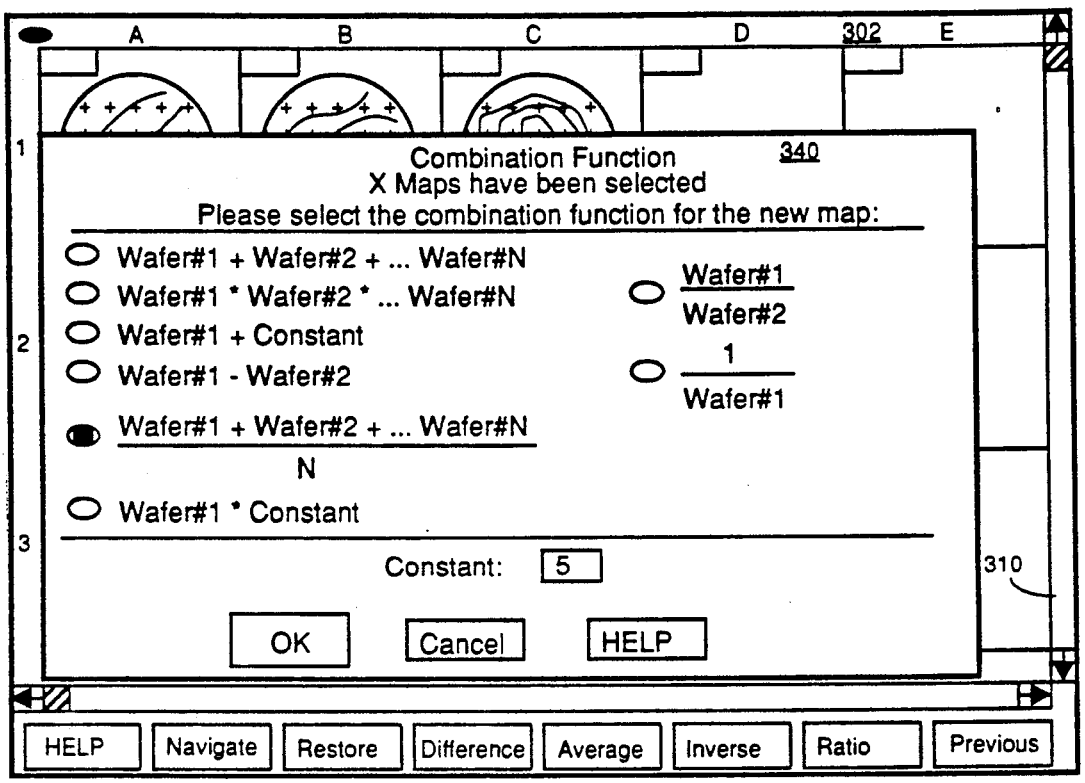

FIG. 27 shows the display generated by selecting the Combine Data command from data analysis menu 332. The Combine Data menu 340 gives the user a full range of options for combining selected cells of data.

In summary, since each cell is an independent data analysis unit, the user of the system may assign each cell a different type of display or data analysis function using these data mapping and data analysis menus.

Figure 28:
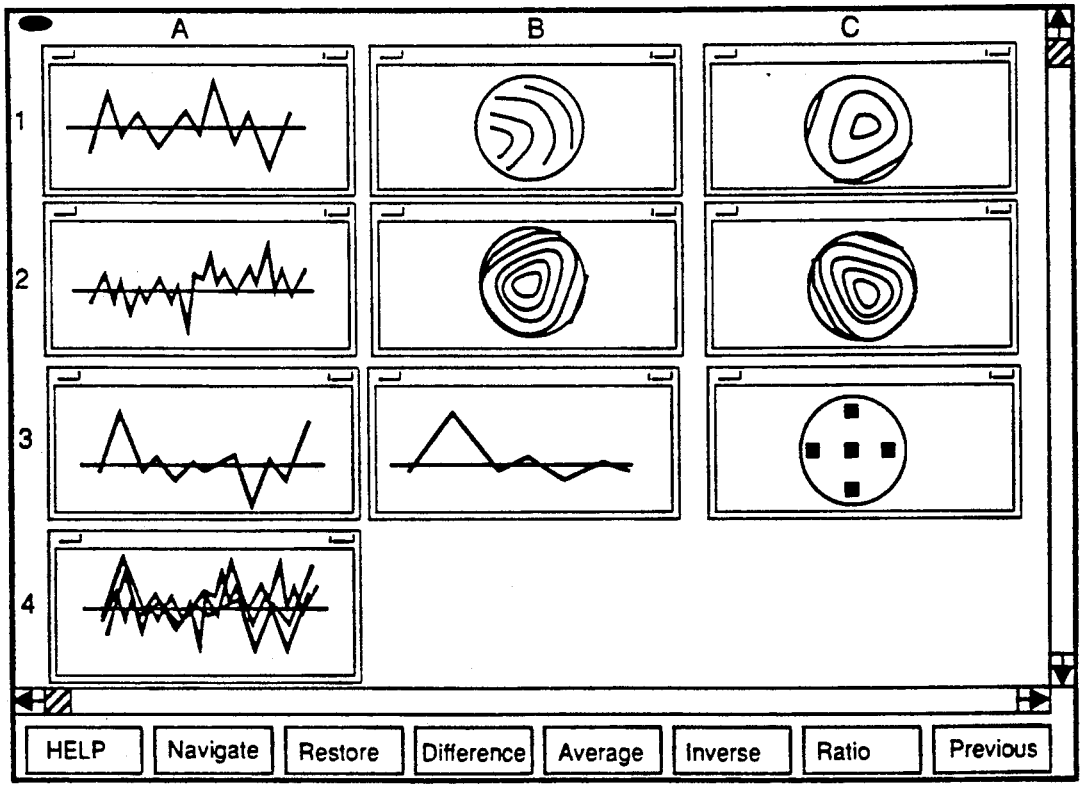

Referring to FIG. 28, in another embodiment of the Gallery display software 210, cells in the Gallery display could be defined to display trend charts, as well as wafer maps. Particularly useful would be Gallery displays in which a set of trend charts is shown in column A, while selected data points from each trend chart are shown in columns to the right of the corresponding trend chart. As with other cells, the trend chart cells would be fully functional data analysis units, allowing the user to enlarge a selected trend chart cell and select additional points to display in the Gallery, as well as any other data analysis tasks permitted by the trend chart display software.

Extending the analogy to conventional spreadsheet programs, another feature that is planned to be added to the preferred embodiment is the use of "linked" Galleries of cells so as to form a "three dimensional" Gallery of graphic images. This is somewhat analogous to linked numerical spreadsheets, except that in the context of the present invention the cells in each two dimensional Gallery contain graphic images. An example of when a three dimensional Gallery would be useful is as follows: each row of the Gallery concerns a particular wafer (e.g., five wafers from the same wafer lot), each column concerns a different measurement parameter (e.g., Row A=Yield, Row B=Film Thickness, Row C=Resistivity), and each layer of the Gallery would relate to a different layer or process step. Thus, for example, one Gallery could show data for a first polysilicon layer, the next Gallery could show data for an oxide layer, a third Gallery could show data for a second polysilicon layer, and so on. Added to the Gallery display would be NEXT GALLERY and PREVIOUS GALLERY buttons, for moving up and down through the Gallery layers. Such a three dimensional Gallery will facilitate the review of large sets of measurement data, and will help engineers to determine the source of faults and process drifts in their manufacturing facilities. It is believed that adding this type of linkage between Galleries to the basic Gallery spreadsheet software described above is within the skill of programmers working on this type of product.

SYSTEM NAVIGATOR

Referring to FIG. 7, it can be seen that the preferred embodiment uses a rather deep hierarchy of data structures, herein called the data hierarchy, so as to allow flexible data organization. There is also a separate hierarchy of system commands, herein called the command hierarchy, for selecting tasks to be executed by the system. The downside of a deep data hierarchy is having to go "up and down" the hierarch through a large number of menus in order to switch from one data analysis task to another. For instance, from the display in FIG. 4, one would have to use the "Previous Screen" command a half dozen times to back up to the main menu before being able to execute a data collection task.

To overcome this potential problem, the present invention provides a system "Navigator" which can be invoked from virtually any display simply by selecting the "Navigate" command. The Navigator is a set of pull down menus which immediately move the user to a particular task, and to the top of the data hierarchy, thereby avoiding having to go back to the main menu and also avoiding the next command or two to work one's way down through the various task selection menus.

Figure 29:
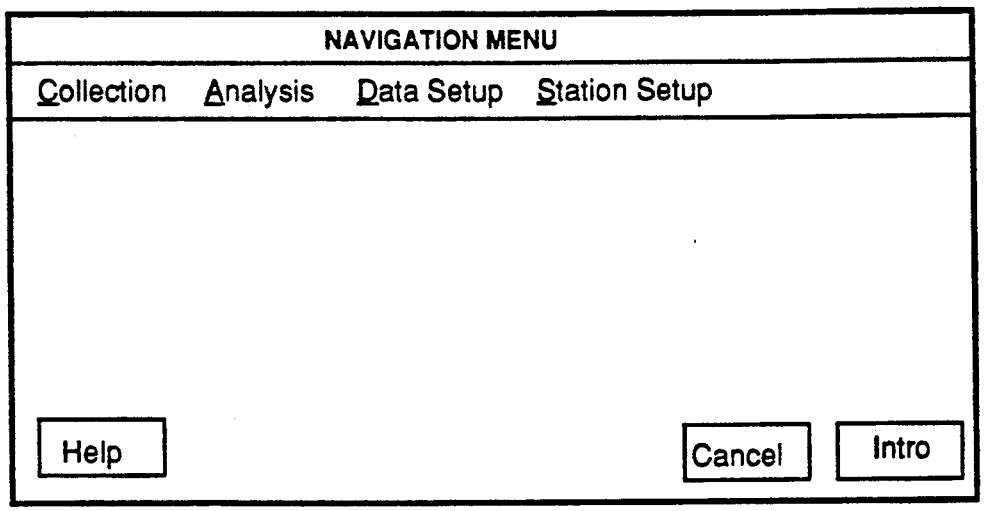
FIGS. 29, 30, 31, 32 and 33 depict menus associated with the system navigation feature of the present invention.

FIG. 29 shows the Navigator menu produced upon execution of the Navigate command from any system menu or data analysis display, such as those displays shown in FIGS. 4, and 13-28. The Navigate command is available from virtually all displays in the system, allowing the user to jettison whatever task is currently being performed and to move directly to a new task without having to go through a large number of task selection menus.

Figure 30:
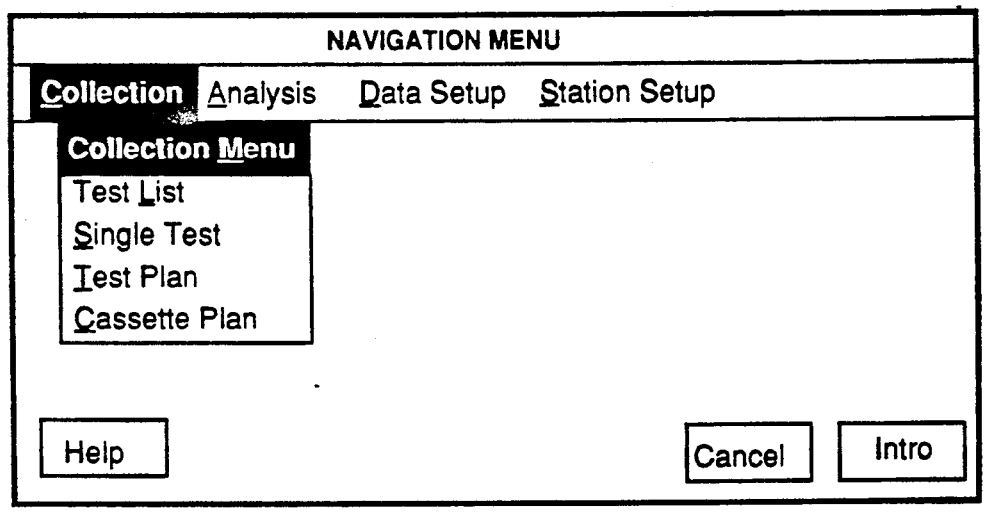

FIGS. 30, 31, 32 and 33 show the various pull down menus generated by executing the Navigate command. FIG. 30 shows the pull down menu associated with data collection tasks. By selecting one of the items in this pull down menu, the user avoids not only having to go back to the main menu (FIG. 12), but also avoids the next menu, which is equivalent to the Collection Menu produced by the System Navigator software.

Figure 31:
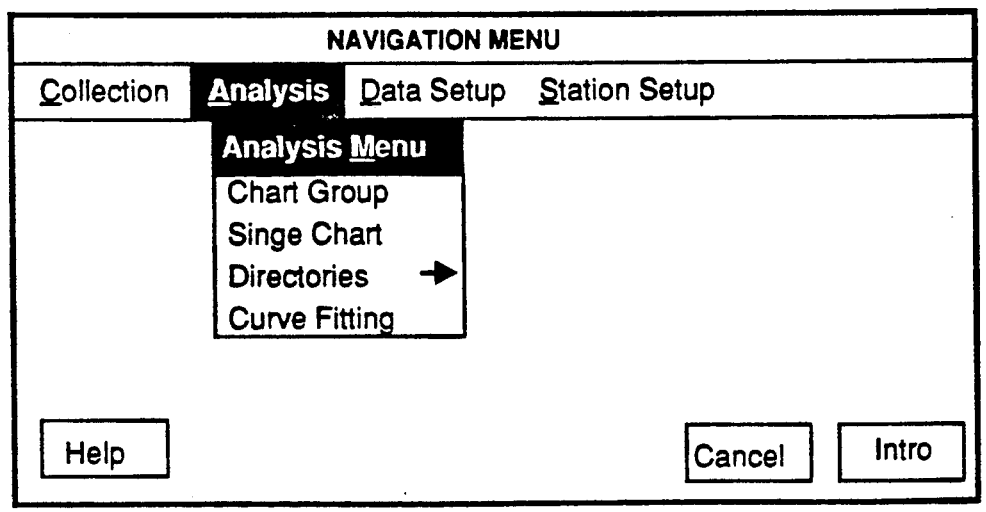
Figure 32:
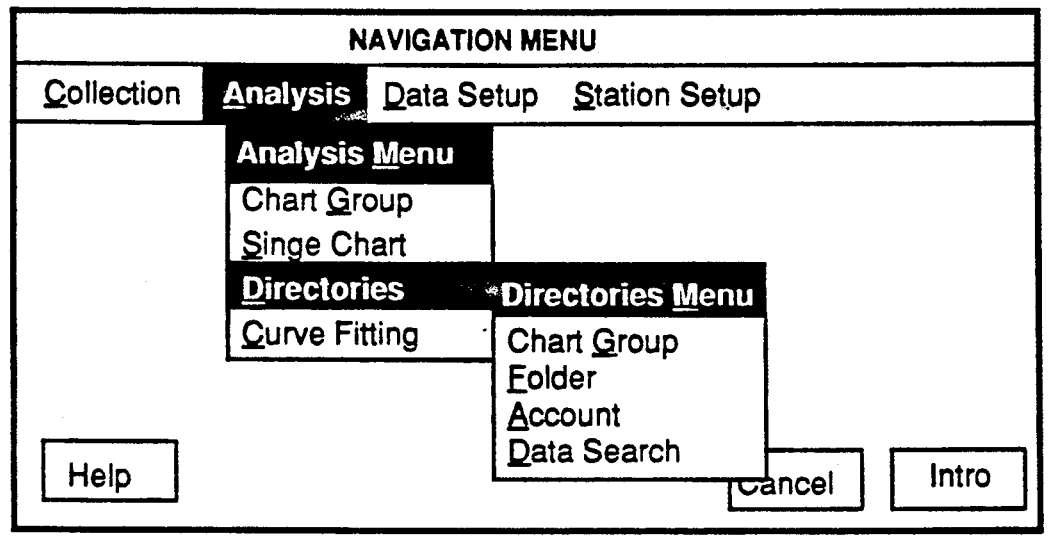
Figure 33:
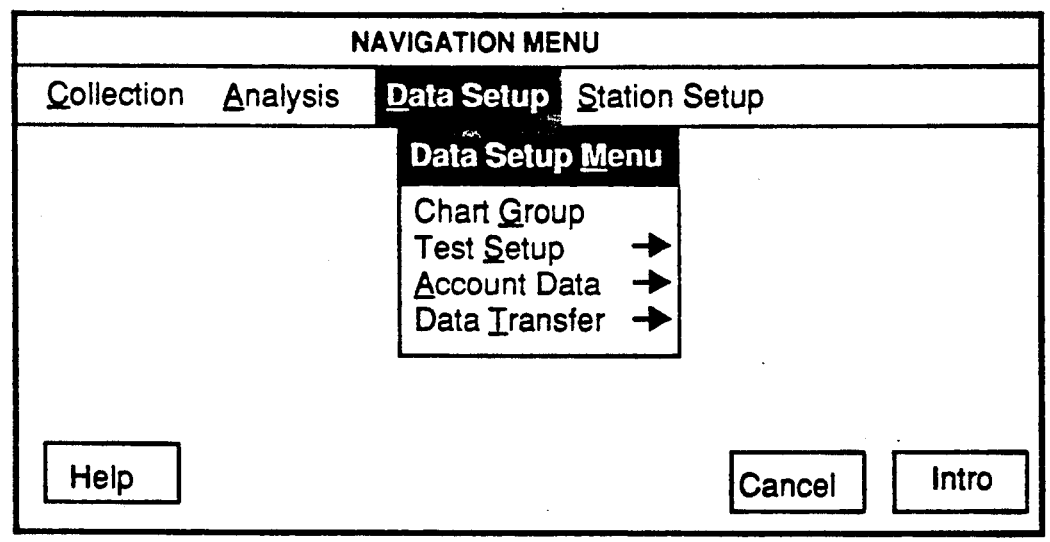

FIG. 31 shows the pull down menu associated with data analysis tasks, which is the primary focus of this document. Items marked with an arrow, such as the Directory item, have a sub-menu that is displayed when the item with the arrow is selected, as shown in FIG. 32. Thus the System Navigator software not only reproduces the choices available from the top level command menus, but also can reproduce the choices available in subsequent menus through the use of additional pull down menus as shown in FIG. 32. In this way skilled users can skip over a number of menus and can move directly to the new task. FIG. 33 is the pull down menu associated with data set up tasks, such as defining chart groups, setting up tests, new accounts, and so on.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A data analysis system, comprising:
    data storage means for storing measurement data in a stored data structure, including means for storing measurement data obtained from a multiplicity of distinct predefined processes; said stored measurement data being organized in a multilevel data hierarchy in which measurement data from each said predefined process comprises a distinct branch of said multilevel data hierarchy;
    chart definition means, coupled to said data storage means, for defining a multiplicity of data analysis charts, each data analysis chart depicting stored measurement data for a specified one of said predefined processes;
    chart group definition means for defining a multiplicity of chart groups, each chart group denoting a plurality of specified ones of said defined data analysis charts, including means for storing said chart group definitions; said chart group definition means including user selection means for selecting ones of said defined data analysis charts to include in each chart group (A) such that a user can select to include in a specified chart group, without restriction, any selected combination of data analysis charts for stored measurement data anywhere in said multilevel data hierarchy; and (B) such that individual ones of said data analysis charts can be included in multiple ones of said chart groups;
    chart display means, coupled to said chart group definition means and said chart definition means, for displaying selected ones of said data analysis charts, including means for selecting one of said defined chart groups, for selecting one or more of said data analysis charts in said selected chart group, and for then simultaneously displaying said selected data analysis charts.

2. The data analysis system of claim 1,
    displaying in each said displayed data analysis chart a selectably positionable pointer for pointing at an individual data point; and selecting and performing a predefined task on the stored measurement data corresponding to the data point being pointed at by said selectably positionable pointer.

3. A data analysis system, comprising:

data storage means for storing measurement data in a stored data structure, including means for storing measurement data obtained from a multiplicity of distinct predefined processes; said stored measurement data being organized in a multilevel data hierarchy in which measurement data from each said predefined process comprises a distinct branch of said multilevel data hierarchy;

trend chart definition means, coupled to said data storage means, for defining a multiplicity of trend charts, each trend chart comprising a sequence of data points for a specified one of said predefined processes, each data point representing at least a portion of the measurement data collected during a particular execution of said specified predefined process;

chart group definition means for defining a multiplicity of chart groups, each chart group denoting a plurality of specified ones of said defined trend charts, including means for storing said chart group definitions; said chart group definition means including user selection means for selecting ones of said defined trend charts to include in each chart group (A) such that a user can select to include in a specified chart group, without restriction, any selected combination of trend charts for stored measurement data anywhere in said multilevel data hierarchy; and (B) such that individual ones of said trend charts can be included in multiple ones of said chart groups; and trend chart display means, coupled to said chart group definition means and said trend chart definition means, for displaying selected ones of said trend charts, including means for selecting one of said defined chart groups, for selecting one or more of said trend charts in said selected chart group, and for then simultaneously displaying said selected trend charts, each trend chart depicting a sequence of data points in accordance with one of said trend chart definitions.

4. The data analysis system of claim 3, displaying in each said displayed trend chart a selectably positionable pointer for pointing at an individual data point; and selecting and performing a predefined task on the stored measurement data corresponding to the data point being pointed at by said selectably positionable pointer.

5. The data analysis system of claim 3, wherein said stored data structure includes means for storing information useable for identifying stored measurement data;

said trend chart display further includes means for displaying in said trend chart a data point identifier which corresponds to said data identifying information stored in the stored data structure corresponding to the data point being pointed at by said selectably positionable pointer;

whereby said trend chart provides a visual indication of the identity of the measurement data.

6. The data analysis system of claim 3, wherein said data analysis program includes means for:

displaying a trend chart in which each of the data points in the trend chart represents the mean and standard deviation of the measurement data in a corresponding data structure;

defining a target value and a range of acceptable mean values for the measurement data being represented by said trend chart; and superimposing on said data points in said trend chart an indication of said target value and said range of acceptable mean values;

whereby said trend chart provides a visual indication of the difference between the mean values of the collected data represented by said trend chart and said target value, and also provides a visual indication of measurements outside said range of acceptable mean values.

7. A data analysis system, comprising:

data storage means for storing sets of measurement data, each said set of data representing a set of related measurements obtained using a predefined process;

gallery definition means, coupled to said data storage means, for defining a two dimensional array of cells, and for assigning to each of at least a subset of said cells a cell definition selected from the set consisting of (A) one of said sets of measurement data, and (B) a mathematical combination of a plurality of specified ones of said sets of measurement data; and gallery display means, coupled to said gallery definition means, for displaying a two dimensional array of cells, each cell containing a data map depicting a set of data in accordance with a corresponding one of said cell definitions.

8. The data analysis system of claim 7, wherein said gallery definition means includes means for storing for each said cell a set of display parameters defining how said measurement data assigned to said cell is to be displayed;

said display means providing a menu access box for each said displayed cell, said menu access box providing means for updating said stored display parameters for said displayed cell.

9. The data analysis system of claim 7, said gallery definition means including means for storing for each said cell a set of analysis control parameters defining how said measurement data assigned to said cell is to be displayed and means for changing said analysis control parameters for individually selected ones of said cells;

whereby each said cell functions as a separate data analysis cell.

10. A data analysis system, comprising:

data storage means for storing sets of measurement data, each said set of data representing a set of related measurements obtained using a predefined process;

gallery definition means, coupled to said data storage means, for defining a two dimensional array of cells, and for assigning to each of at least a subset of said cells a cell definition selected from the set consisting of (A) one of said sets of measurement data, (B) a mathematical combination of a plurality of specified ones of said sets of measurement data, and (C) a chart/graph with data points representing a multiplicity of said sets of measurement data; and gallery display means, coupled to said gallery definition means, for displaying a two dimensional array of cells, each cell depicting a set of data in accordance with a corresponding one of said cell definitions.

11. The data analysis system of claim 10,
said gallery definition means including means for storing for each said cell a set of analysis control parameters defining how said measurement data assigned to said cell is to be displayed and means for changing said analysis control parameters for individually selected ones of said cells;
whereby each said cell functions as a separate data analysis cell.

12. The data analysis system of claim 10,
said gallery definition means including:
user selection means for (A) selecting ones of said displayed cells, (B) specifying a mathematical operation to be performed on the selected cells, and (C) specifying at least one target cell; and
cell definition update means, coupled to said user selection means, for assigning to said specified at least one target cell a cell definition consisting of said specified mathematical operation applied to said selected cells.

13. A data analysis system, comprising:
data storage means for storing sets of data that can be displayed graphically;
gallery definition means, coupled to said data storage means, for defining a two dimensional array of cells, and for assigning to each of at least a subset of said cells a cell definition selected from the set consisting of (A) one of said sets of data, and (B) data resulting from a specified mathematical operation performed on one or more specified ones of said sets of data; and
gallery display means, coupled to said gallery definition means, for displaying a two dimensional array of cells, each cell containing a graphic image depicting a set of data in accordance with a corresponding one of said cell definitions.

14. The data analysis system of claim 13,
said gallery definition means including:
user selection means for (A) selecting ones of said displayed cells, (B) specifying a mathematical operation to be performed on the selected cells, and (C) specifying at least one target cell; and
cell definition update means, coupled to said user selection means, for assigning to said specified at least one target cell a cell definition consisting of said specified mathematical operation applied to said selected cells.

15. The data analysis system of claim 14, said means for updating said displayed two dimensional array of cells whenever the cell definition of at least one displayed cell is changed so that said displayed cells are displayed in accordance with said cell definitions of said displayed cells.

16. The data analysis system of claim 13, further including:
chart definition means, coupled to said data storage means, for defining a multiplicity of data analysis charts, each data analysis chart depicting a sequence of said stored sets of data as a sequence of data points such that each data point in said each defined data analysis chart has associated therewith at least one of said sets of data;
chart group definition means for defining a multiplicity of chart groups, each chart group denoting a plurality of specified ones of said defined data analysis charts, including means for storing said chart group definitions;
user selection means for selecting ones of said defined data analysis charts to include in each chart group (A) such that a user can select to include in a specified chart group, without restriction, any selected combination of data analysis charts, and (B) such that individual ones of said data analysis charts can be included in multiple ones of said chart groups;
chart display means, coupled to said chart group definition means and said chart definition means, for displaying selected ones of said data analysis charts, including means for selecting one of said defined chart groups and for selecting and displaying at least one of said data analysis charts in said selected chart-group;
said user selection means including means, coupled to said gallery definition means, for selecting individual data points within each displayed data analysis chart; and
said gallery definition means including means for assigning to individual cells in said two dimensional array of cells the at least one set of data associated with each selected data point.

17. The data analysis system of claim 16,
said gallery definition means including:
user selection means for (A) selecting ones of said displayed cells, (B) specifying a mathematical operation to be performed on the selected cells, and (C) specifying at least one target cell; and
cell definition update means, coupled to said user selection means, for assigning to said specified at least one target cell a cell definition consisting of said specified mathematical operation applied to said selected cells.

18. The data analysis system of claim 13, said data storage means storing said sets of data in a multilevel data hierarchy;
said data analysis system further including:
chart definition means, coupled to said data storage means, for defining a multiplicity of data analysis charts, each data analysis chart depicting a sequence of said stored sets of data as a sequence of data points such that each data point in said each defined data analysis chart has associated therewith at least one of said sets of data;
chart group definition means for defining a multiplicity of chart groups, each chart group denoting a plurality of specified ones of said defined data analysis charts, including means for storing said chart group definitions;
user selection means for selecting ones of said defined data analysis charts to include in each chart group (A) such that a user can select to include in a specified chart group, without restriction, any selected combination of data analysis charts for sets of data stored anywhere in said multilevel data hierarchy; and (B) such that individual ones of said data analysis charts can be included in multiple ones of said chart groups;
chart display means, coupled to said chart group definition means and said chart definition means, for displaying selected ones of said data analysis charts, including means for selecting one of said defined chart groups and for selecting and displaying at least one of said data analysis charts in said selected chart group;

said user selection means including means, coupled to said gallery definition means, for selecting individual data points within each displayed data analysis chart; and said gallery definition means assigning to individual cells in said two dimensional array of cells the at least one set of data associated with each selected data point.

19. The data analysis system of claim 18, said gallery definition means including:

user selection means for (A) selecting ones of said displayed cells, (B) specifying a mathematical operation to be performed on the selected cells, and (C) specifying at least one target cell; and cell definition update means, coupled to said user selection means, for assigning to said specified at least one target cell a cell definition consisting of said specified mathematical operation applied to said selected cells.

20. A data analysis system, comprising:

data storage means for storing sets of measurement data, each said set of data representing a set of related measurements obtained using a predefined process; and chart definition means, coupled to said data storage means, for defining a multiplicity of data analysis charts, each data analysis chart depicting a sequence of stored measurement data values for a specified one of said predefined processes; and chart display means, coupled to said chart group definition means, for (A) displaying selected ones of said data analysis charts, including expand bar means for displaying with each data analysis chart an expand bar having two ends and a expansion selection element positioned at a position between said two ends of said expand bar and (B) for enabling a user of said system to move said expansion element to various positions along said expansion bar, and (C) for scaling one dimension, parallel to said expansion bar, of each said displayed data analysis chart in accordance with the position of said expansion selection element.

21. The data analysis system of claim 20, wherein when said expansion selection element is positioned at a first end of said expansion bar said data analysis chart is scaled so as to compress said chart to predefined maximum degree, when said expansion selection element is positioned at a second end of said expansion bar said data analysis chart is scaled so as to expand said chart to predefined maximum degree, and when said expansion selection element is positioned between said first and second ends of said expansion bar said data analysis chart is scaled in proportion to said expansion selection element's proximity to said ends of said expansion bar.

22. The data analysis system of claim 20, said chart display means including means for selecting and then simultaneously displaying a plurality of said data analysis charts, each displayed data analysis chart having its own corresponding expansion bar; wherein said expansion selection element for each displayed data analysis chart is individually positioned;

whereby said simultaneously displayed data analysis charts may be separately scaled so as to facilitate visual comparison thereof.

23. A data analysis system, comprising:

data storage means for storing sets of data that can be displayed graphically;

graphical spreadsheet definition means, coupled to said data storage means, for defining a two dimensional array of cells, and for assigning to each of at least a subset of said cells a cell data definition and a cell representation definition, each said cell data definition selected from the set consisting of (A) one of said sets of data, and (B) data resulting from a specified mathematical operation performed on one or more specified ones of said sets of data; each said cell representation definition specifying, for a corresponding cell in said array of cells, a graphical representation method for representing a set of data defined by said corresponding cell's cell data definition; and graphical spreadsheet display means, coupled to said graphical spreadsheet definition means, for displaying at least a subset of said two dimensional array of cells, each displayed cell to which a cell data definition has been defined containing a graphical representation of data in accordance with said cell's cell data definition and cell representation definition.

24. The data analysis system of claim 23, said means for updating said displayed two dimensional array of cells (A) whenever the cell data definition of at least one displayed cell is changed, and (B) whenever the cell representation definition of at least one displayed cell is changed, so that said displayed cells are displayed in accordance with said cell data definitions and cell representation definitions of said displayed cells.

25. The data analysis system of claim 24, said graphical spreadsheet definition means including:

user selection means for (A) selecting ones of said displayed cells, (B) specifying a mathematical operation to be performed on the selected cells, and (C) specifying at least one target cell; and cell definition update means, coupled to said user selection means, for assigning to said specified at least one target cell a cell data definition consisting of said specified mathematical operation applied to said selected cells.

26. A data analysis system, comprising:

data storage means for storing sets of data that can be displayed graphically;

chart definition means, coupled to said data storage means, for defining a multiplicity of data analysis charts, each data analysis chart depicting a sequence of said stored sets of data as a sequence of data points such that each data point in said each defined data analysis chart represents at least one of said sets of data;

chart display means, coupled to said chart group definition means and said chart definition means, for displaying selected ones of said data analysis charts;

user selection means, coupled to said chart display means, for selecting individual data points within each displayed data analysis chart;

graphical spreadsheet definition means, coupled to said data storage means and said user selection means, for defining a two dimensional array of cells, and for assigning to each of at least a subset of said cells a cell definition, each said cell definition selected from the set consisting of (A) one of said sets of data, and (B) data resulting from a specified mathematical operation performed on one or more specified ones of said sets of data;

said graphical spreadsheet definition means including means for assigning to individual cells in said two dimensional array of cells the at least one set of data represented by each selected data point; and graphical spreadsheet display means, coupled to said graphical spreadsheet definition means, for displaying at least a subset of said two dimensional array of cells, each displayed cell to which a cell definition has been assigned containing a graphical representation of data in accordance with said cell's cell definition.

27. The data analysis system of claim 26, said means for updating said displayed two dimensional array of cells whenever the cell definition of at least one displayed cell is changed so that said displayed cells are displayed in accordance with said cell definitions of said displayed cells.

28. The data analysis system of claim 27, said graphical spreadsheet definition means including:

user selection means for (A) selecting ones of said displayed cells, (B) specifying a mathematical operation to be performed on the selected cells, and (C) specifying at least one target cell; and cell definition update means, coupled to said user selection means, for assigning to said specified at least one target cell a cell definition consisting of said specified mathematical operation applied to said selected cells.

* * * * *